(12) United States Patent
Noda et al.

(10) Patent No.: US 7,750,534 B2
(45) Date of Patent: Jul. 6, 2010

(54) DRIVE DEVICE AND DRIVE SYSTEM

(75) Inventors: Atsuhiro Noda, Ashiya (JP); Akira Kosaka, Yao (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 98 days.

(21) Appl. No.: 12/011,260

(22) Filed: Jan. 25, 2008

(65) Prior Publication Data

US 2008/0179992 A1    Jul. 31, 2008

(30) Foreign Application Priority Data

Jan. 30, 2007   (JP) .............................. 2007-019027

(51) Int. Cl.
    *H02N 2/14*    (2006.01)
(52) U.S. Cl. .................... 310/316.01; 310/317
(58) Field of Classification Search ................. 310/317, 310/316.01

See application file for complete search history.

(56) References Cited

U.S. PATENT DOCUMENTS

| | | | | |
|---|---|---|---|---|
| 6,051,909 A | * | 4/2000 | Shinke et al. | .......... 310/316.01 |
| 6,084,363 A | * | 7/2000 | Mizumoto | .................. 318/116 |
| 6,803,699 B2 | * | 10/2004 | Yuasa et al. | ................. 310/317 |
| 7,190,104 B2 | * | 3/2007 | Yuasa | ......................... 310/317 |
| 7,271,522 B2 | * | 9/2007 | Yuasa et al. | ................. 310/317 |
| 2007/0030318 A1 | * | 2/2007 | Sato et al. | ..................... 347/68 |

FOREIGN PATENT DOCUMENTS

JP    2004-80964 A    3/2004

* cited by examiner

*Primary Examiner*—Walter Benson
*Assistant Examiner*—Bryan P Gordon
(74) *Attorney, Agent, or Firm*—Sidley Austin LLP

(57) ABSTRACT

Driving techniques are provided for achieving a sufficiently low-speed drive and smooth change in the drive speed. Voltage is applied to an electromechanical element by repeating an output cycle in which one voltage value out of a first voltage value is output during a first period, a second voltage value lower than the first voltage value is output during a second period, a third voltage value lower than the second voltage value is output during a third period, and finally the second voltage value is output during a fourth period. Further, a mechanism for changing the lengths of the respective periods is provided to allow for a sufficiently low-speed drive and smooth change in the drive speed.

19 Claims, 15 Drawing Sheets

F I G. 6
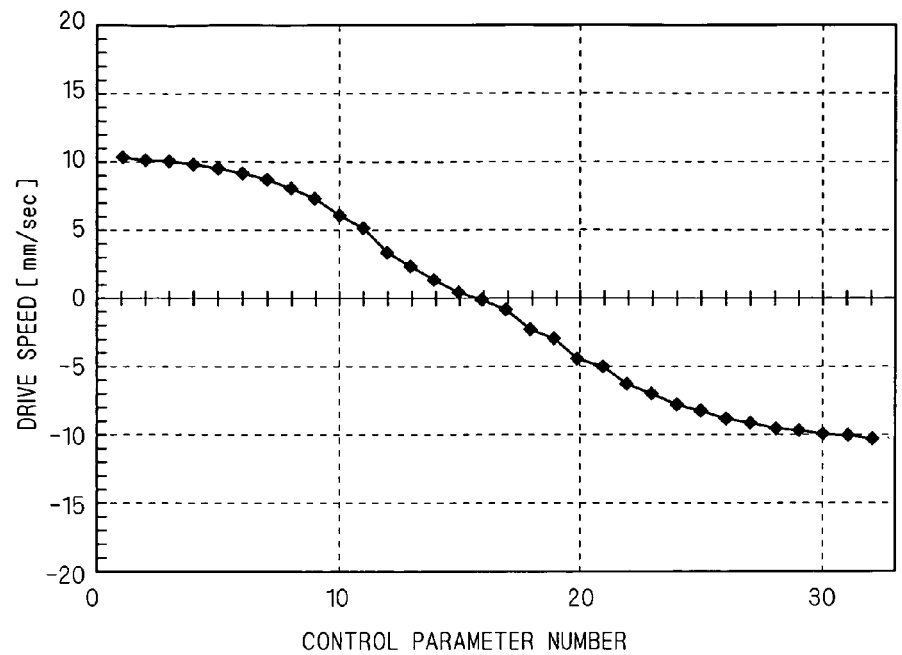
F I G. 7
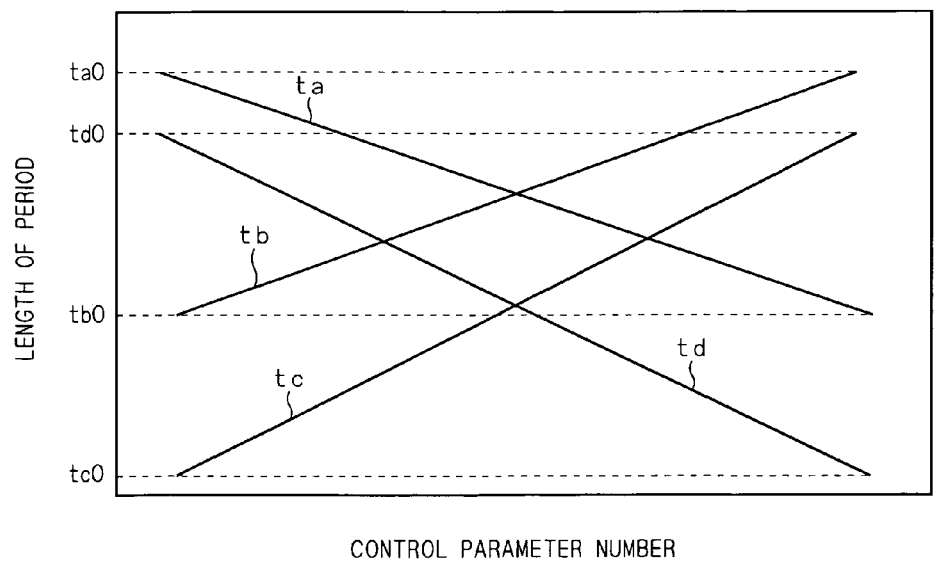

F I G . 1 4
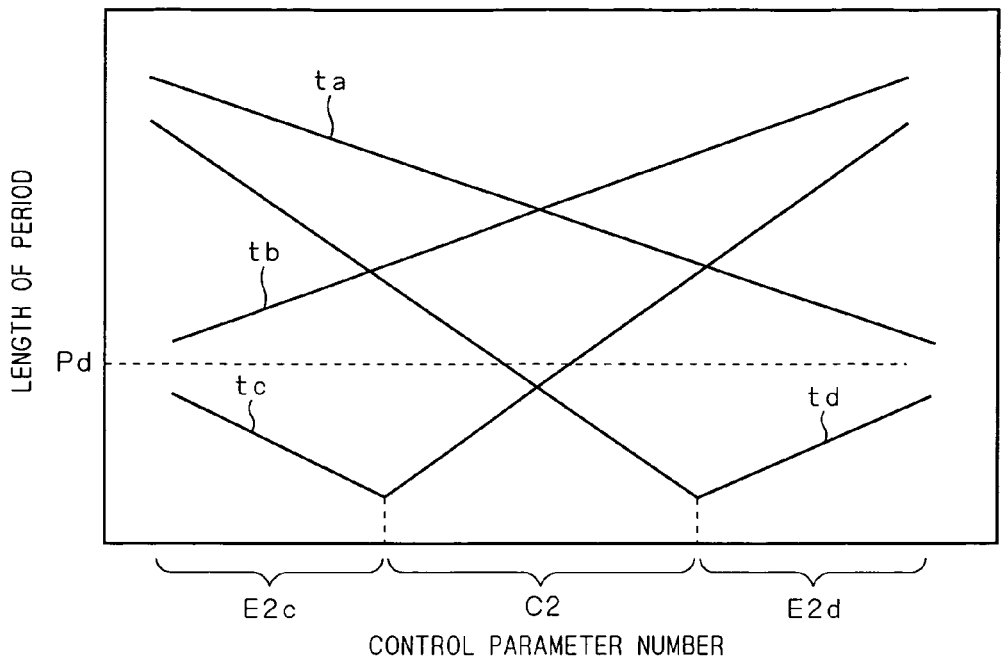
F I G . 1 5
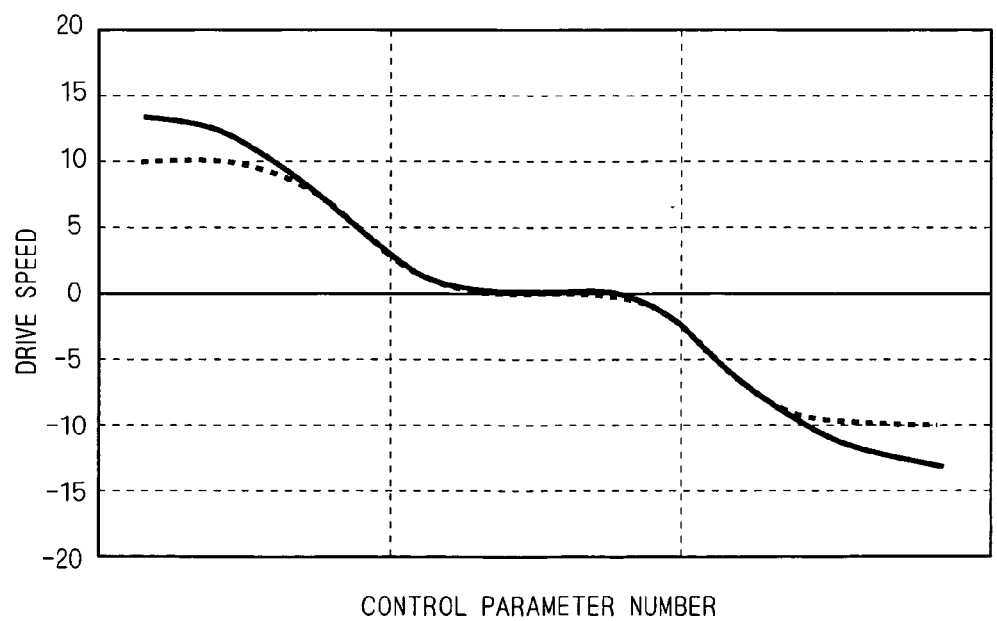

DRIVE DEVICE AND DRIVE SYSTEM

This application is based on application No. 2007-19027 filed in Japan, the contents of which are hereby incorporated by reference.

BACKGROUND OF THE INVENTION

1. Field of the Invention

The present invention relates to driving techniques.

2. Description of the Background Art

Various types of drive devices using electromechanical transducers such as piezoelectric elements have been proposed.

For example, in a fixed element type drive device schematically shown in FIGS. 21A to 21C, a piezoelectric element 92 which is an electromechanical transducer is fixed at its one end in directions of expansion and contraction to a fixed member 91 and at the other end to a driven friction member 94. The driven friction member 94 moves in forward and backward directions with expansion and contraction of the piezoelectric element 92. The driven friction member 94 is engaged with a moving part 93 by a frictional force.

The moving part 93 is driven by application of voltage to the piezoelectric element 92 to cause the piezoelectric element 92 to expand and contract at different speeds. FIGS. 21A to 21C show the conditions at times Pa, Pb, and Pc, respectively, upon application of voltage having a forward waveform shown in FIG. 22.

For a gradual rise of the voltage waveform during a time interval between Pa and Pb in FIG. 22, the piezoelectric element 92 expands relatively slowly so that the condition of FIG. 21A transitions to the condition of FIG. 21B. At this time, the moving part 93 substantially moves integrally with the driven friction member 94 without or almost without sliding over the driven friction member 94.

Subsequently, for a rapid fall of the voltage waveform during a time interval between Pb and Pc, the piezoelectric element 92 contracts relatively rapidly so that the driven friction member 94 rapidly returns to its initial position. At this time, slippage occurs between the driven friction member 94 and the moving part 93, so that only the driven friction member 94 returns to its initial position with no substantial movement of the moving part 93. The result is that the moving part 93, as shown in FIG. 21C, moves in the forward direction from its initial position of FIG. 21A.

By repetitions of this cycle, the moving part 93 is moved along the driven friction member 94.

It is noted that the moving part 93 moves in the backward direction upon application of voltage having a backward waveform with steep rising edges and gentle falling edges to the piezoelectric element 92.

There are the following two techniques for applying a sawtooth voltage to the piezoelectric element 92.

FIGS. 23A to 23C illustrate the first technique. Referring to FIG. 23A, for example an 8-bit sawtooth voltage of 0 to 5 V is generated by a digital analog converter of a waveform generator 95 and is input to a power amplifier 96, in which then the sawtooth voltage is amplified to, for example, 0 to 10 V for drive and applied to a piezoelectric element Pv. By controlling the waveform generator 95, both a forward sawtooth waveform shown in FIG. 23B and a backward sawtooth waveform shown in FIG. 23C can be generated.

FIG. 24 and FIGS. 25A and 25B illustrate the second technique. Referring to FIG. 24, for application of voltage of a power supply 97 to a piezoelectric element Pv, a circuit including constant-current circuits 98a and 98b and switching circuits 99a and 99b is used, in which the constant-current circuits 98a and 98b and the switching circuits 99a and 99b are alternately operated to generate forward and backward waveforms.

More specifically, for example a digital circuit shown in FIG. 25A is configured, in which control signals as shown in FIG. 25B are input to terminals Ra to Rd to thereby generate forward and backward waveforms.

In other words, after a HIGH signal is input to the terminal Ra to gradually raise voltage applied through the constant-current circuit 98a to the piezoelectric element Pv, then a HIGH signal is input to the terminal Rb to ground the piezoelectric element Pv through the switching circuit 99b to thereby rapidly drop the voltage applied to the piezoelectric element Pv. This produces a forward waveform Ha.

Also, after a HIGH signal is input to the terminal Rc to apply the voltage of the power supply 97 through the switching circuit 99a to the piezoelectric element Pv, then a HIGH signal is input to the terminal Rd to ground the piezoelectric element Pv through the constant-current circuit 98b. This produces a backward waveform Hb.

However, the first technique requires the waveform generator 95 and the power amplifier 96, and the second technique requires the constant-current circuits 98a and 98b and the switching circuits 99a and 99b, thus both facing the problems of circuit complexity and high cost.

Accordingly, drive devices with simpler circuit configurations are suggested (for example in Japanese Patent Application Laid-open No. JP2004-80964). The drive device of JP2004-80964 exercises drive control using three values (maximum, minimum, and mean values) of voltage applied to a piezoelectric element.

However, although allowing some degree of low-speed drive using the maximum, minimum, and mean voltage values, the drive device of JP2004-80964 still has difficulty in addressing lower-speed drive required in servo control or the like. In addition, it is also difficult to smoothly change the drive speed with a change in the direction of movement from the forward (normal) to the backward (opposite) direction.

SUMMARY OF THE INVENTION

The invention is directed to a drive device.

According to an aspect of the invention, the drive device includes an electromechanical transducer expanding and contracting in response to application of voltage; a given member moving back and forth with expansion and contraction of the electromechanical transducer; a moving part being engaged with the given member by a frictional force and capable of moving relative to the given member with expansion and contraction of the electromechanical transducer; and a voltage applying part applying voltage to the electromechanical transducer by repetition of an output cycle in which a selected one of a first voltage value, a second voltage value lower than the first voltage value, and a third voltage value lower than the second voltage value is output. The output cycle is a cycle of firstly outputting the first voltage value during a first period, secondly outputting the second voltage value during a second period, thirdly outputting the third voltage value during a third period, and finally outputting the second voltage value during a fourth period. The voltage applying part includes a speed changer that changes a moving speed of the moving part relative to the given member by varying the lengths of the first to fourth periods. The speed changer, during increasing the length of the first period, changes at least either one of the rates of change in the lengths of the second and fourth periods to the change in the length of the first period.

This allows a sufficiently low-speed drive and a smooth change in the drive speed.

According to another aspect of the invention, the drive device includes an electromechanical transducer expanding and contracting in response to application of voltage; a given member moving back and forth with expansion and contraction of the electromechanical transducer; a moving part being engaged with the given member by a frictional force and capable of moving relative to the given member with expansion and contraction of the electromechanical transducer; and a voltage applying part applying voltage to the electromechanical transducer by repetition of an output cycle in which a selected one of a first voltage value, a second voltage value lower than the first voltage value, and a third voltage value lower than the second voltage value is output. The output cycle is a cycle of firstly outputting the first voltage value during a first period, secondly outputting the second voltage value during a second period, thirdly outputting the third voltage value during a third period, and finally outputting the second voltage value during a fourth period. The voltage applying part includes a speed changer that changes a moving speed of the moving part relative to the given member by varying the lengths of the first to fourth periods. The speed changer varies the lengths of the first to fourth periods so that at least either one of the second and fourth periods is equal to or shorter than a time required for discharge of the electromechanical transducer.

This allows a sufficiently low-speed drive and a smooth change in the drive speed.

According to still another aspect of the invention, the drive device includes an electromechanical transducer expanding and contracting in response to application of voltage; a given member moving back and forth with expansion and contraction of the electromechanical transducer; a moving part being engaged with the given member by a frictional force and capable of moving relative to the given member with expansion and contraction of the electromechanical transducer; and a voltage applying part applying voltage to the electromechanical transducer by repetition of an output cycle in which a selected one of a first voltage value, a second voltage value lower than the first voltage value, and a third voltage value lower than the second voltage value is output. The output cycle is a cycle of firstly outputting the first voltage value during a first period, secondly outputting the second voltage value during a second period, thirdly outputting the third voltage value during a third period, and finally outputting the second voltage value during a fourth period. The voltage applying part, with reference to one end of the electromechanical transducer, applies voltage corresponding to the first to third voltage values between the one end and the other end of the electromechanical transducer. The first voltage value is a positive value, the second voltage value is zero, and the third voltage value is a negative value which is the same but with an opposite sign as the first voltage value. The voltage applying part includes a speed changer that changes a moving speed of the moving part relative to the given member by varying the lengths of the first to fourth periods. The speed changer, during decreasing the length of the fourth period, changes the rate of change in the length of the first period to the change in the length of the fourth period, while keeping the sum total of the first to fourth periods at substantially a given period of time, keeping the sum of the first and third period at a first fixed period of time, and keeping the sum of the second and fourth periods at a second fixed period of time.

This allows a sufficiently low-speed drive and a smooth change in the drive speed.

The invention is also directed to a drive system in which a given drive mechanism is driven by a drive device.

It is therefore an object of the invention to provide a driving technique that allows a sufficiently low-speed drive and a smooth change in the drive speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows measured values of the drive speed resulting from speed control by time-range control of the drive waveform;

FIG. 7 shows the relationship between time ranges in the drive waveform and control parameter number;

FIG. 14 illustrates the relationship between the time ranges in the drive waveform and the control parameter number;

FIG. 15 shows measured values of the drive speed resulting from speed control by time-range control of the drive waveform;

DESCRIPTION OF THE PREFERRED EMBODIMENTS

Hereinbelow, preferred embodiments of the invention are described with reference to the drawings.

<Structure of Drive Device>

Figure 1A:
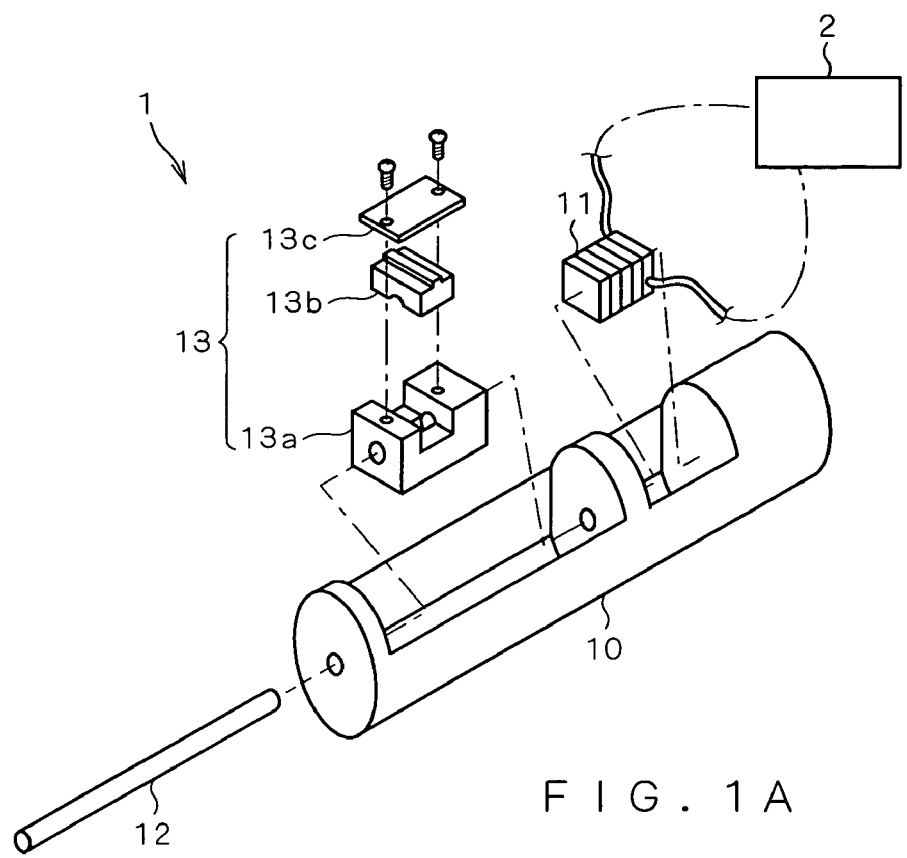
FIGS. 1A and 1B illustrate the essential part of the structure of a drive device 1 according to a preferred embodiment of the invention.
Figure 1B:
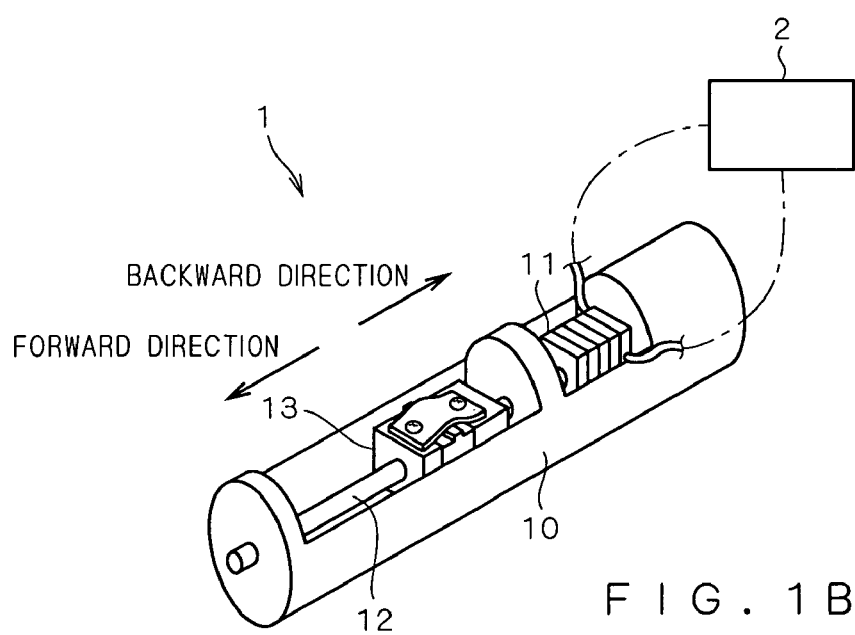

FIGS. 1A and 1B show the essential part of the structure of a drive device 1 according to a preferred embodiment of the invention. FIG. 1A is an exploded perspective view of the drive device 1, and FIG. 1B is an assembled perspective view of the drive device 1.

The drive device 1 includes a fixed part of equipment such as a fixed member 10 attached to a base (not shown) of an XY drive table; a piezoelectric element 11 having, for example, a laminated structure; a drive shaft 12 slidably supported by the fixed member 10; and a driven part such as a drive unit 13 coupled to a stage (not shown) of the XY drive table.

The piezoelectric element 11 has one of its end faces in the direction of its expansion and contraction fixedly coupled to the fixed member 10 and the other of the end faces in the direction of its expansion and contraction fixedly coupled to one of axial end faces of the drive shaft 12 serving as a driven friction member (a given member).

The drive shaft 12 is engaged with the drive unit (moving part) 13 including a slider 13a, a friction member 13b, and a plate spring 13c by a frictional force.

The drive device 1 causes the drive shaft 12 to axially move back and forth with the expansion and contraction of the piezoelectric element 11 that expands and contracts in response to application of voltage from a drive circuit 2, thereby enabling the movement of the drive unit 13 relative to the drive shaft 12.

Figure 2:
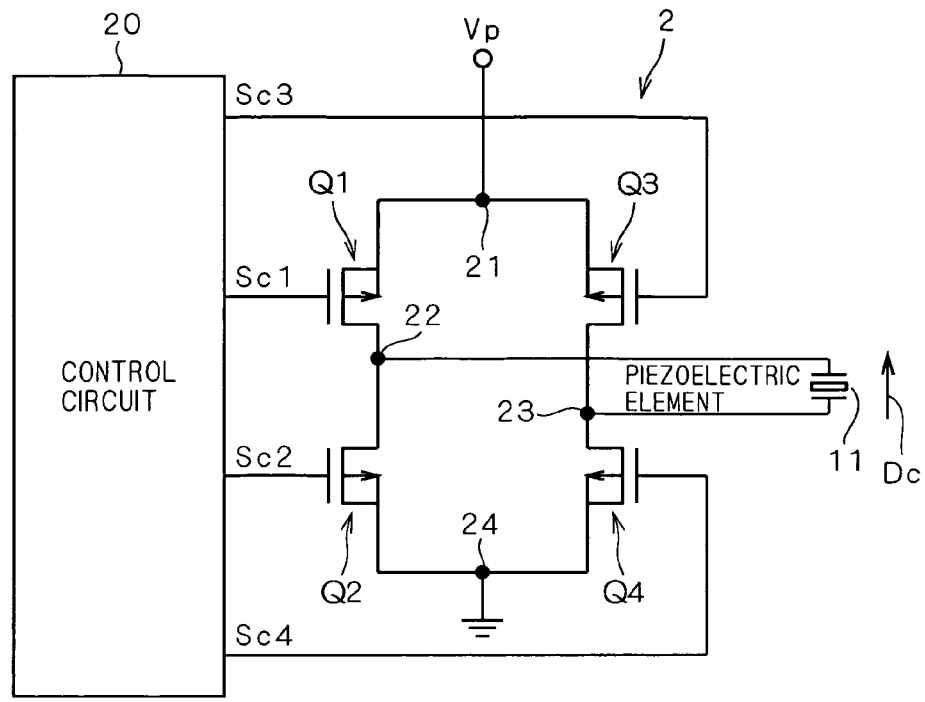
FIG. 2 shows a circuit configuration of a drive circuit 2.

FIG. 2 shows a circuit configuration of the drive circuit 2.

The drive circuit 2 includes a control circuit 20 and four switching elements Q1 to Q4 and applies voltage across the terminals of the piezoelectric element 11.

The switching elements Q1 to Q4 are MOS-FETs with their gates connected to terminals Sc1 to Sc4 of the control circuit 20, respectively, and receiving either a HIGH or a LOW signal.

The switching elements Q1 and Q3 are P-channel FETs, in which a LOW signal input to the gate establishes conduction between the source and drain (a conducting state), while a HIGH signal input to the gate ceases conduction between the source and drain (a non-conducting state). The switching elements Q2 and Q4 are N-channel FETs, in which a HIGH signal input to the gate establishes conduction between the source and drain (a conducting state), while a LOW signal input to the gate ceases conduction between the source and drain (a non-conducting state).

The sources of the switching elements Q1 and Q3 are connected through a junction point 21 to a power supply voltage Vp. The drain of the switching element Q1 is connected through a junction point 22 to the drain of the switching element Q2, and the drain of the switching element Q3 is connected through a junction point 23 to the drain of the switching element Q4. The sources of the switching elements Q2 and Q4 are grounded through a junction point 24. The terminals of the piezoelectric element 11 are connected to the junction points 22 and 23.

<Operation of Drive Device>

The operation of the drive device 1 with the aforementioned configuration is now described.

Figure 3:
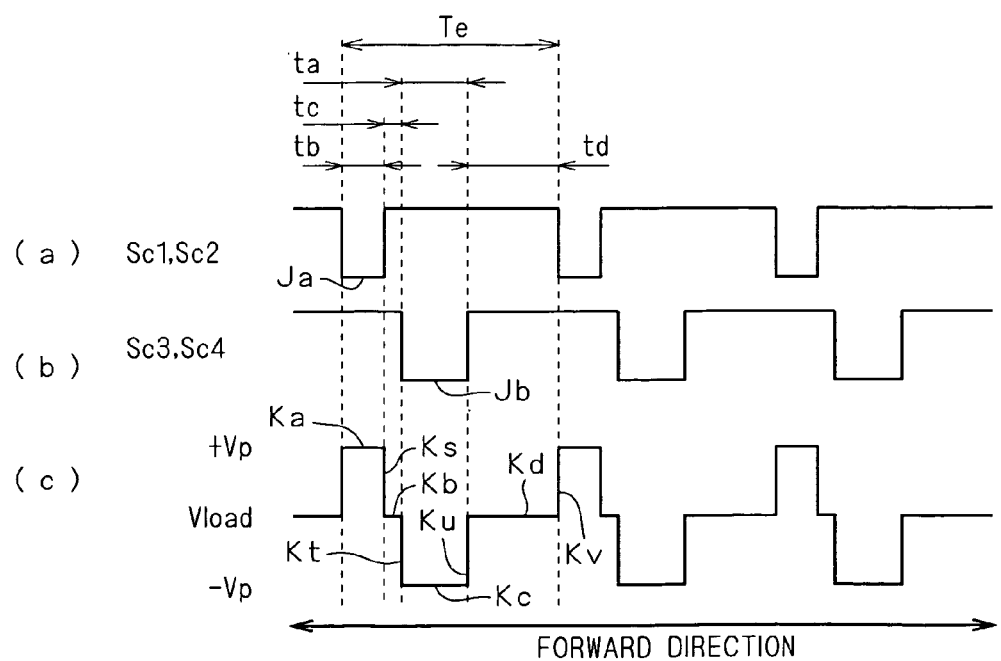
FIG. 3 is an explanatory diagram for explanation of the operation of a control circuit 20.

First of all, principles of drive by time-range control of a drive waveform are described with reference to FIG. 3. In FIG. 3, (a) shows a voltage at the terminals Sc1 and Sc2 of the control circuit 20 (i.e., the gate voltage of the switching elements Q1 and Q2); (b) shows a voltage at the terminals Sc3 and Sc4 of the control circuit 20 (i.e., the gate voltage of the switching elements Q3 and Q4); and (c) shows a drive voltage Vload applied across the terminals of the piezoelectric element 11. This drive voltage Vload is positive for the direction indicated by the arrow Dc in FIG. 2.

The drive device 1 is capable of driving the drive unit 13 in forward and backward directions by repetitions of a cycles Te consisting of first to fourth periods described later and is also capable of changing the moving speed of the drive unit 13 relative to the drive shaft 12 by varying the lengths of the first to fourth periods. It is to be noted that the signals shown by (a) to (c) in FIG. 3 are only one example when the drive unit 13 is driven in the forward direction.

First, during the first period tb, the voltage at the terminals Sc1 and Sc2 becomes LOW as indicated by a signal Ja of voltage (a) in FIG. 3, and the voltage at the terminals Sc3 and Sc4 remains HIGH as indicated by voltage (b) in FIG. 3. With such signal conditions during the first period tb, in the drive circuit 2, the switching elements Q1 and Q4 are in the ON or conducting state, and the switching elements Q2 and Q3 are in the OFF or non-conducting state. The result is that the junction point 23 is grounded through the switching element Q4 and the junction point 22 is connected through the switching element Q1 to the power supply voltage Vp. Thus, the drive voltage Vload across the piezoelectric element 11 becomes +Vp (the maximum value) that is equivalent to the power supply voltage as indicated by a signal Ka of voltage (c) in FIG. 3.

Subsequently, during the second period tc, the voltage at the terminals Sc1 and Sc2 becomes HIGH as indicated by voltage (a) in FIG. 3, and the voltage at the terminals Sc3 and Sc4 still remains HIGH as indicated by voltage (b) in FIG. 3. With such signal conditions during the second period tc, in the drive circuit 2, the switching elements Q1 and Q3 are in the OFF or non-conducting state, and the switching elements Q2 and Q4 are in the ON or conducting state. The result is that the junction point 22 is connected through the switching elements Q2 and Q4 to the junction point 23, which causes a short circuit between the terminals of the piezoelectric element 11. Thus, the drive voltage Vload across the piezoelectric element 11 becomes 0 volts (first mean value) as indicated by a signal Kb of voltage (c) in FIG. 3.

During the third period ta, the voltage at the terminals Sc1 and Sc2 remains HIGH as indicated by voltage (a) in FIG. 3, while the voltage at the terminals Sc3 and Sc4 becomes LOW as indicated by a signal Jb of voltage (b) in FIG. 3. With such signal conditions during the third period ta, the switching elements Q1 and Q4 are in the OFF or non-conducting state, and the switching elements Q2 and Q3 are in the ON or conducting state. The result is that the junction point 22 is grounded through the switching element Q2 and the junction point 23 is connected through the switching element Q3 to the power supply voltage Vp. Thus, the drive voltage Vload becomes −Vp (the minimum value) as indicated by a signal Kc of voltage (c) in FIG. 3.

During the last fourth period td (td=Te−ta−tb−tc), the voltage at the terminals Sc1 and Sc2 still remains HIGH as indicated by voltage (a) in FIG. 3, while the voltage at the terminals Sc3 and Sc4 becomes HIGH as indicated by voltage (b) in FIG. 3. With such signal conditions during the fourth period td, the switching elements Q1 and Q3 are in the OFF or non-conducting state, and the switching elements Q2 and Q4 are in the ON or conducting state. The result is that the junction point 22 is connected through the switching elements Q2 and Q4 to the junction point 23, which causes a short circuit between the terminals of the piezoelectric element 11. Thus, the drive voltage Vload becomes 0 volts (second mean value) as indicated by a signal Kd of voltage (c) in FIG. 3.

As described above, the drive circuit 2 applies voltage to the piezoelectric element 11 by repetitions of an output cycle of outputting a selected one of three voltage values: the maximum value (first voltage value) +Vp corresponding to the power supply voltage Vp; the mean value (second voltage value) of 0 volts lower than the maximum value; and the minimum value (third voltage value) −Vp lower than the mean value. Accordingly, as shown in FIG. 3, two rise signals Ku and Kv supplied at relatively long time intervals during one cycle Te of the drive voltage Vload cause the drive unit 13 to be transmitted in the forward direction with the drive shaft 12. On the other hand, two fall signals Ks and Kt supplied at relatively short time intervals during one cycle Te of the drive voltage Vload cause the drive shaft 12 to be relatively rapidly displaced in the backward direction. At this time, the drive unit 13 attempts to move in the backward direction, but the amount of that movement (the amount of backward movement) is smaller than the amount of its movement in the forward direction. Therefore, by repetitions of this operation, the drive unit 13 can be driven in the forward direction along the drive shaft 12.

Here, when the second period tc is extended without changing the length of one cycle Te and with the total time (ta+tb) of the first period tb and the third period ta and the total time (tc+td) of the second period tc and the fourth period td both being kept constant, the first period tb is extended at the same time. In other words, when the second period tc is extended, the third period ta and the fourth period td are shortened and the first period tb is extended; and when the second period tc is shortened, the third period ta and the fourth period td are extended and the first period tb is shortened. And, when the first period tb and the third period ta are equal in length, the second period tc and the fourth period td are also made to be equal in length. This allows a continuous change in the drive waveform of the drive unit 13 from the forward to the backward direction, between which directions there is a neutral condition under which the drive unit 13 moves neither in the forward nor in the backward direction, thereby allowing a smooth change in the drive speed of the drive unit 13. Now, this method of speed control by time-range control of the drive waveform is described in detail.

FIGS. 4A to 4C and FIGS. 5A to 5D are explanatory diagrams for explanation of speed control by time-range control of the drive waveform, showing the drive waveforms with stepwise changing speeds and drive directions of the drive unit 13.

Figure 4A:
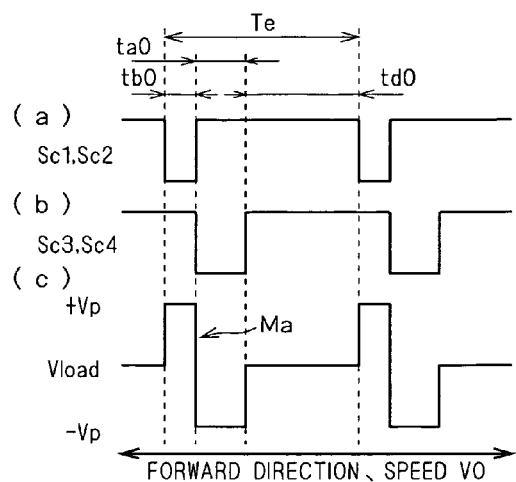
FIGS. 4A to 4C and FIGS. 5A to 5D are explanatory diagrams for explanation of speed control by time-range control of a drive waveform.

FIG. 4A shows the drive waveform when the second period tc=0 in FIG. 3. In this drive waveform, as shown by (c) in FIG. 4A, a fall signal Ma of the drive voltage Vload shows the steepest fall, so that the drive unit 13 remains at its current position with little movement in the backward direction. Thus, in this case, the drive unit 13 moves in the forward direction at the maximum moving speed V0.

Figure 4B:
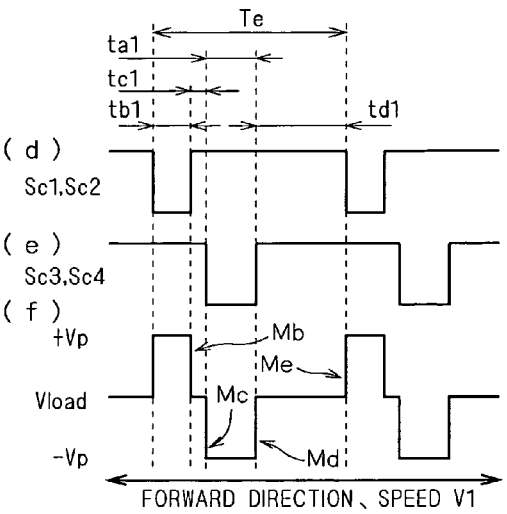

Then, as shown in FIG. 4B, the time interval between rise signals Md and Me of the drive voltage Vload is shortened and the time interval between fall signals Mb and Mc is extended by the amount shortened in order to reduce the amount of forward movement caused by the rising of the drive voltage Vload and to increase the amount of backward movement caused by the falling of the drive voltage Vload. This correlatively slows down the drive speed of the drive unit 13 as compared with the case of the drive waveform shown by (c) in FIG. 4A.

Figure 4C:
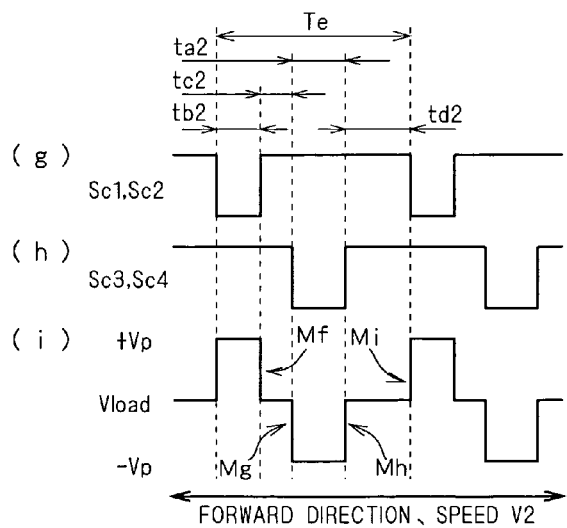

Similarly, as shown in FIG. 4C, the drive speed of the drive unit 13 moving in the forward direction can be slowed down by shortening the time interval between rise signals Mh and Mi of the drive voltage Vload and extending the time interval between fall signals Mf and Mg of the drive voltage Vload.

Figure 5A:
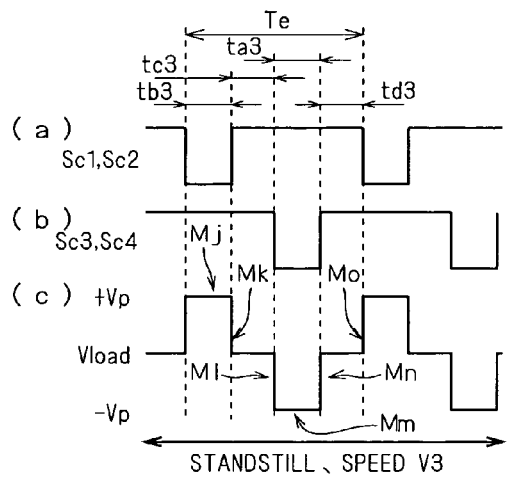

When the time interval between the rise signals of the drive voltage Vload is further shortened and the time interval between the fall signals thereof is further extended, those time intervals become equal (FIG. 5A). At this time, in order to make equal the period (first period) tb3 of a signal Mj of the drive voltage Vload during which the maximum value +Vp is output and the period (third period) ta3 of a signal Mm of the drive voltage Vload during which the minimum value −Vp is output, the lengths of the first period tb and the third period ta are smoothly adjusted so that the signal waveform at the terminals Sc1 and Sc2, shown by (a) in FIG. 5A, and the signal waveform at the terminals Sc3 and Sc4, shown by (b) in FIG. 5A, have the same shape.

This makes equal the amount of forward movement of the drive unit 13 caused by rise signals Mn and Mo of the drive voltage Vload and the amount of backward movement of the drive unit 13 caused by fall signals Mk and Ml of the drive voltage Vload. Accordingly, the drive unit 13 moving at a moving speed V3 of almost zero comes to a standstill.

Figure 5B:
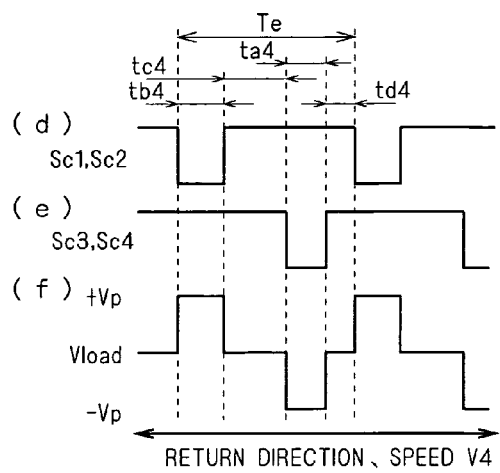
Figure 5C:
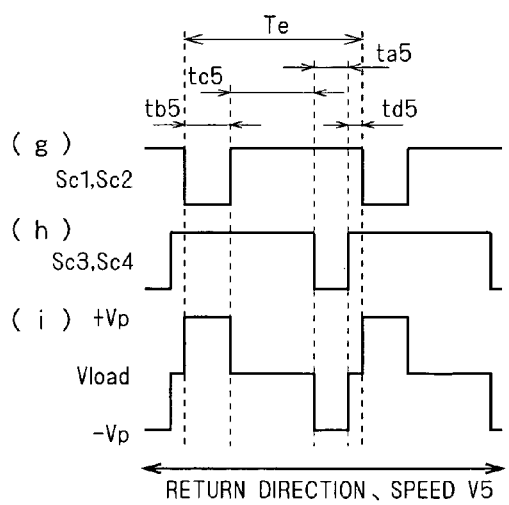

From this standstill, the time interval between the rise signals of the drive voltage Vload is further shortened and the time interval between the fall signals of the drive voltage Vload is further extended in order to produce the waveforms of the drive signals shown in FIGS. 5B and 5C. With these drive waveforms, the amount of backward movement of the drive unit 13 caused by the fall signals becomes greater than the amount of forward movement thereof caused by the rise signals, unlike in the state of the forward drive shown in FIGS. 4A to 4C. Accordingly, a moving speed V4 with the drive waveform of FIG. 5B and a moving speed V5 (V5>V4) with the drive waveform of FIG. 5C are both the speed of movement in the backward direction.

Figure 5D:
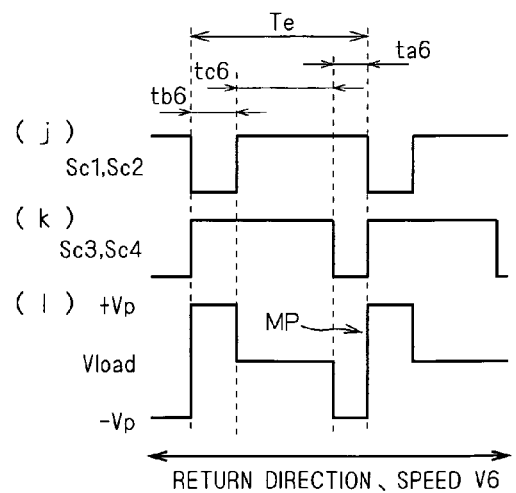

Then, by further shortening the time interval between the rise signals so that the fourth period td=0, the drive waveform shown in FIG. 5D is produced in which a rise signal Mp of the drive voltage Vload shows the steepest rise. The signal waveforms shown by (j) and (k) in FIG. 5D are equivalent to interchanging the signal waveform at the terminals Sc1 and Sc2, shown by (a) in FIG. 4A with the signal waveform at the terminals Sc3 and Sc4, shown by (b) in FIG. 4A. The drive unit 13 driven with this drive waveform moves in the backward direction at the maximum moving speed V6 that is almost equivalent to the maximum moving speed V0 in the forward direction.

As described above, the output time (second period) of the first mean value of the drive voltage Vload and the output time (fourth period) of the second mean value of the drive voltage Vload are complementarily increased and decreased, and at the same time, the output time (first period) of the maximum value of the drive voltage Vload and the output time (third period) of the minimum value of the drive voltage Vload are complementarily increased and decreased. This makes it possible to continuously change the speed of the drive unit 13 with a change in the direction of movement from the forward to the backward direction FIG. 6 is a graph showing measured values of the drive speed when the time ranges in the drive waveform are changed by the method of speed control described above.

In FIG. 6, the horizontal axis indicates the control parameter number, and the vertical axis indicates the drive speed of the drive unit 13. The control parameter number refers to the number assigned to each control parameter at each point of time when time zones (the first to fourth periods) for output of the aforementioned values, i.e., the maximum value, the first mean value, the second mean value, and the minimum value, are gradually changed, and it ranges from 1 which is assigned to the control parameter specifying the maximum moving speed in the forward direction as shown in FIG. 4A to 32 which is assigned to the control parameter specifying the maximum moving speed in the backward direction as shown in FIG. 5D. It is to be noted that control parameter number 16 represents control of the standstill of the drive unit 13 shown in FIG. 5A.

As shown in the graph of FIG. 6, a change of the control parameters with different time ranges of the first to fourth periods makes it possible to almost linearly and continuously change the drive speed of the drive unit 13 with a change in the direction of movement from the forward to the backward direction.

FIG. 7 shows the relationship between the time ranges of the first to fourth periods and the control parameter number.

As shown in FIG. 7, the first period tb monotonously increases from its initial value tb0 in proportion to the increase in the control parameter number and finally becomes the same period of time as the initial value ta0 of the third period ta. The second period tc monotonously increases from its initial value tc0 in proportion to the increase in the control parameter number and finally becomes the same period of time as the initial value td0 of the fourth period td. The third period ta monotonously decreases from its initial value ta0 in proportion to the increase in the control parameter number and finally becomes the same period of time as the initial value tb0 of the first period tb. The fourth period td monotonously decreases from its initial value td0 in proportion to the increase in the control parameter number and finally becomes the same period of time as the initial value tc0 of the second period tc. That is, as described above, the first period tb and the third period ta are in a complementary relationship, and the second period tc and the fourth period td are in a complementary relationship.

The cycle Te, which is the sum total of the first to fourth periods tb, tc, ta, and td, is determined in accordance with a specific frequency (resonance frequency) of the piezoelectric element 11. It is to be noted herein that, if the cycle Te is set to be approximately equal to a cycle of the resonance frequency of the piezoelectric element 11, the amplitude of the vibration of the piezoelectric element 11 become the maximum, so that the movement of the drive unit 13 relative to the drive shaft 12 becomes faster.

<Problems Due to Properties of Piezoelectric Element>

If there is a change in the material and preparation conditions of the piezoelectric element 1, the properties of the piezoelectric element 1, such as resonance frequency, will change as well. From this, the cycle Te which is the sum total of the first to fourth periods tb, tc, ta, and td should be changed with a change in the resonance frequency of the piezoelectric element 11.

However, since the piezoelectric element 11 generally has a basic structure with a piezoelectric body sandwiched in between two electrodes, it functions like a capacitor and requires a certain period of time for discharge from when it has a certain potential difference thereacross. This required period of time for discharge can cause problems resulting from the set value of the cycle Te.

Described below are problems that can occur when T2 is the cycle or the sum total of the first to fourth periods ta to td.

Figure 8:
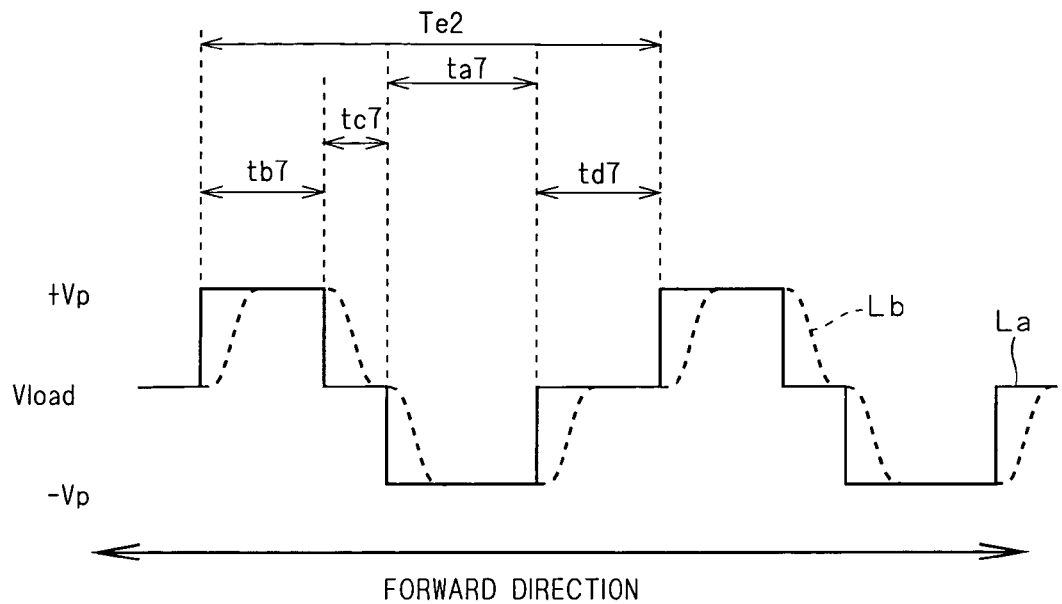
FIG. 8 is a schematic diagram illustrating the relationship between the drive waveform and the charge and discharge of a piezoelectric element.

FIG. 8 shows the relationship between the first to fourth periods tb, tc, ta, and td and the potential difference occurring across the piezoelectric element 11. FIG. 8 shows an example, in which the first, second, third, and fourth periods are referred to as tb7, tc7, ta7, and td7, respectively; the second period tc7 and the fourth period td7 are set to be longer than a time required for discharge, of a potential difference Vp (hereinafter this time is also referred to as a "discharge time requirement"); the first period tb7 and the third period ta7 are set to be longer than a time required for charge of the potential difference Vp (hereinafter this time is also referred to as a "charge time requirement"); and the first voltage value +Vp and the third voltage value −Vp have the same absolute value. In FIG. 8, the solid line La indicates the drive voltage Vload applied to the piezoelectric element 11, and the broken line Lb indicates the potential difference (actual potential difference) applied across the piezoelectric element 11.

As shown in FIG. 8, the actual potential difference stored across the piezoelectric element 11 occurs the time period required for charge and discharge behind the drive voltage Vload applied to the piezoelectric element 11. This is because a change in the drive voltage Vload applied across the piezoelectric element 11 causes a gradual accumulation or discharge of electric charge in the piezoelectric element 11.

In the present example, since the first voltage value +Vp and the third voltage value −Vp have the same absolute value and the second voltage value (mean value) is 0 V, at each point of time when the first to fourth periods tb, tc, ta, and td are switched one after another in time sequence, the drive voltage Vload of 0 V to +Vp, +Vp to 0 V, 0V to −Vp, or −Vp to 0V is applied in time sequence across the piezoelectric element 11. In all of these four modes of charge and discharge, the potential difference applied across the piezoelectric element 11 is common, Vp, so that the speed of charge and discharge of the piezoelectric element 11 is always constant unless the drive voltage Vload is switched to a next value.

And, since the first to fourth periods tb7, tc7, ta7, and td7 are set to be longer than the charge time requirement and the discharge time requirement, the next charge and discharge will not start before completion of the current charge and discharge of the piezoelectric element 1. Accordingly, as shown by the broken line Lb in FIG. 8, both the charge and the discharge show approximately the same inclinations of change (amount of change per given time) in the actual potential difference accumulated across the piezoelectric element 11.

Figure 9:
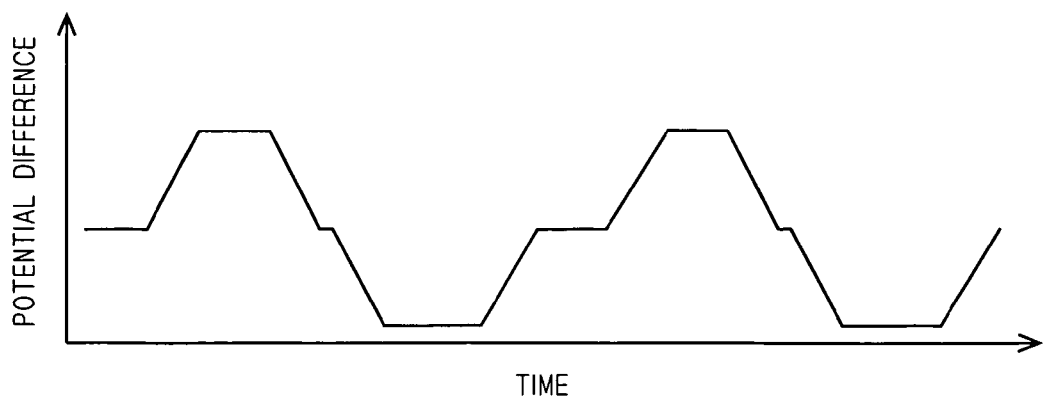
FIG. 9 is a schematic diagram illustrating a change in the charge and discharge of the piezoelectric element with time.

FIG. 9 is a simple plot of the change in the actual potential different accumulated across the piezoelectric element 11 shown by the broken line Lb in FIG. 8 with respect to time. In FIG. 9, the horizontal axis indicates time, and the vertical axis indicates the potential difference accumulated across the piezoelectric element 11.

As shown in FIG. 9, both the increase (rise) and the decrease (fall) in the potential difference accumulated across the piezoelectric element 11 show the same inclinations. Such a change in the potential difference implies that the piezoelectric element 11 expands and contracts at a constant speed. Under this conditions, the piezoelectric element 11 expands at a given speed and contracts at the same given speed, so that the drive speed of the drive unit 13 in the drive device 1 becomes 0.

Now, when the third period ta7 is longer than the second period tc7 and the first period tb7 is longer than the fourth period td7, the drive unit 13 should be driven at a given speed in the forward direction, relative to the drive shaft 12. However, under the conditions specified in FIG. 8, the drive speed of the drive unit 13 in the drive device 1 undesirably becomes 0.

Figure 10:
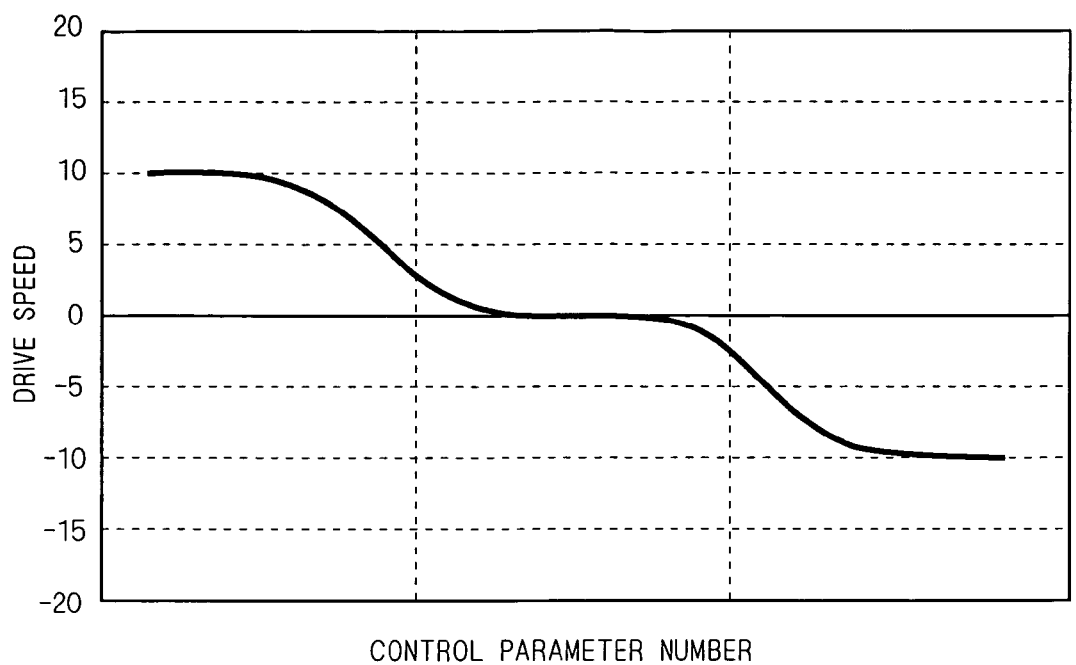
FIG. 10 shows measured values of the drive speed resulting from speed control by time-range control of the drive waveform.

FIG. 10 is a graph showing measured values of the drive speed of drive unit 13 when the time ranges in the drive waveform are changed using a set of control parameters including the conditions specified in FIG. 8.

As shown in FIG. 10, in the vicinity of the middle of the range of variation in the control parameter number, there are a plurality of control parameters that specify the drive speed of 0. Assuming that servo control or the like is performed using a drive device with such control properties, it can be said that there is obvious degradation in control performance.

Figure 11:
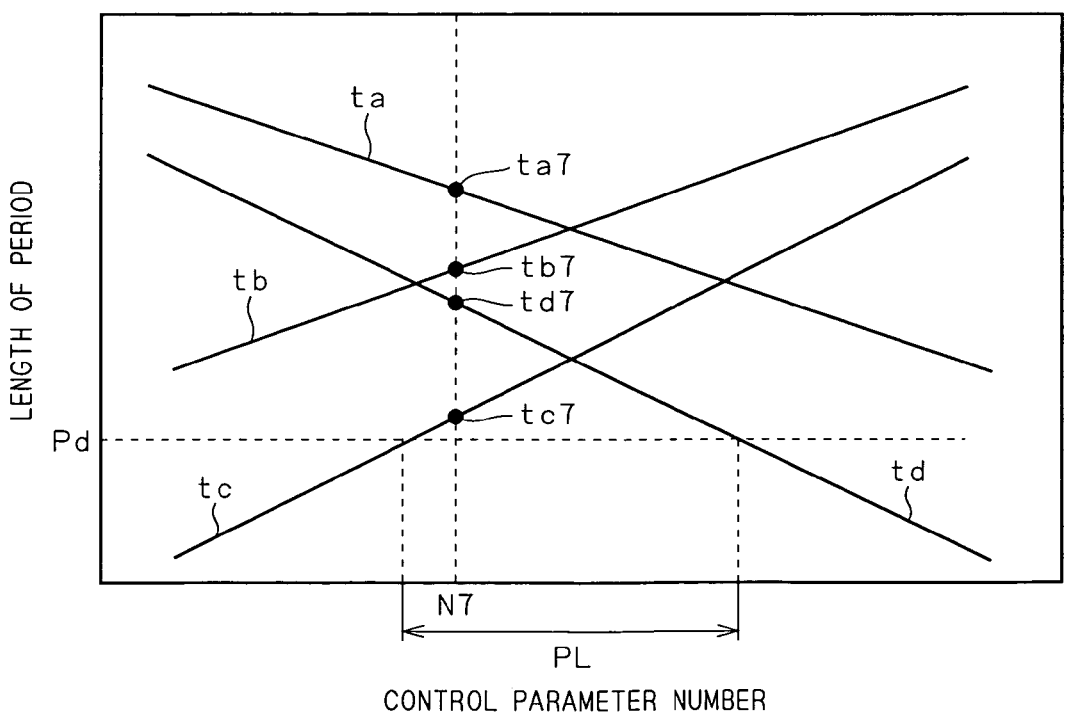
FIG. 11 shows the relationship between the time ranges in the drive waveform and the control parameter number.

FIG. 11 shows the relationship between a set of control parameters including the conditions specified in FIG. 8 and the time ranges of the first to fourth periods tb, tc, ta, and td.

In FIG. 11, the drive waveform for the case of control parameter number N7 corresponds to the drive waveform shown in FIG. 8.

Here, let the discharge time requirement of the piezoelectric element 11 be Pd and when, as shown in FIG. 11, the control parameter number is any number during an interval PL, both the second period tc and the fourth period td become longer than the discharge time requirement Pd. In other words, when the control parameter number is any number during the interval PL, the drive speed of the drive unit 13 undesirably becomes 0, which raises the problem that the drive speed little changes even with the change in the control parameter number.

There is also another problem that, as shown in FIG. 10, in the vicinity of both ends of the range of variation in the control parameter number, the drive speed little changes with the change in the control parameter number.

Described below are measures (namely, the following first to third measures) for avoiding the problem that the drive speed little changes with the change in the control parameter number during a certain interval in the range of variation in the control parameter number, and thereby making the drive device 1 suitable for servo control.

<First Measure>

When, as shown in FIG. 11, both the second period tc and the fourth period td are longer than the discharge time requirement Pd of the piezoelectric element 1, such an undesirable condition as shown in FIG. 10 occurs, in which the drive speed little changes from around 0 even with the change in the control parameter number.

The first measure is thus to set at least either one of the second period tc and the fourth period td to be always equal to or shorter than the time (discharge time requirement) Pd required for discharge of the piezoelectric element 11. In other words, there is a tendency to, before completion of the discharge of the piezoelectric element 11, apply a potential (+Vp or −Vp) in the direction of further accelerating the discharge to the piezoelectric element 11. This setting doesn't allow the drive voltage Vload to be kept at 0 V even after completion of the discharge of the piezoelectric element 11, consequently avoiding the problem that the discharge of the piezoelectric element 11 shows a constant inclination.

By only setting at least either one of the second period tc and the fourth period td to be, preferably always, equal to or shorter than the time (discharge time requirement) Pd required for discharge of the piezoelectric element 11, it is possible to reduce the occurrence of the problem that the drive speed of the drive unit 13 little changes from around 0 even with the change in the control parameter number. However, in order for reduced occurrence of the problem that the drive speed little changes with the change in the control parameter number, it is more preferable that at least either one of the second period tc and the fourth period td should be, definitely always, equal to or shorter than the discharge time requirement Pd.

Now described is a concrete method of setting the condition that at least either one of the second period tc and the fourth period td be equal to or shorter than the discharge time requirement Pd.

Figure 12:
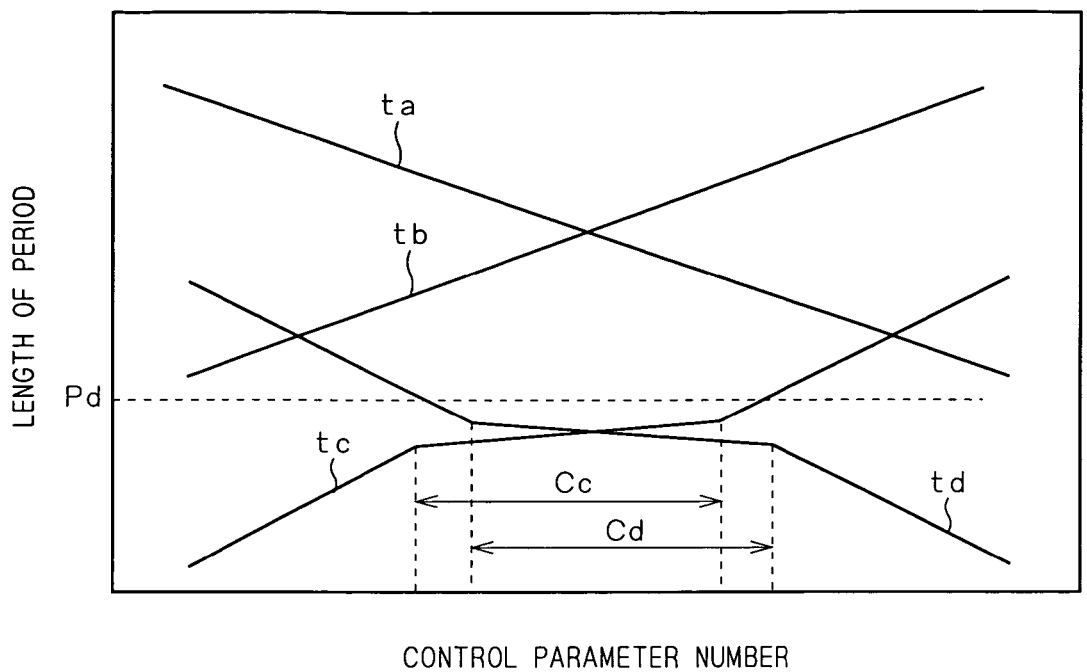
FIG. 12 shows the relationship between the time ranges in the drive waveform and the control parameter number.

FIG. 12 shows the relationship between a set of control parameters and the time ranges of the first to fourth periods tb, tc, ta, and td according to the first measure. In FIG. 12, the first period tb and the third period ta show approximately the same tendencies as those shown in FIG. 11, and the second period tc and the fourth period td show considerably different tendencies from those shown in FIG. 11.

As shown in FIG. 12, the range of variation in the control parameter number is divided into three intervals, and during the two intervals at both ends of the range, the amounts of variation in the lengths of both the second period tc and the fourth period td with the change in the control parameter number are kept relatively large, like those shown in FIG. 11. On the contrary, during the middle interval Cc or Cd of the three-divided range of variation in the control parameter number, the amounts of variation in the lengths of the second period tc and the fourth period td with the change in the control parameter number are kept relatively smaller than those during the intervals at both ends of the range of variation in the control parameter number.

In other words, the inclinations of the amounts of variation in the lengths of both the second period tc and the fourth period td with the change in the control parameter number during the interval Cc or Cd in the vicinity of the middle of the range of variation in the control parameter number are set to be relatively smaller than those during the intervals in the vicinity of both ends of the range of variation in the control parameter number.

In another words, while the length of the second period tc continues to increase with the increase in the control parameter number over the entire range, the inclination of that increase includes a first inclination in the range of the lowest number to around an intermediate number out of the entire range of variation in the control parameter number; a second inclination smaller than the first inclination and in the range of around intermediate numbers out of the entire range of variation in the control parameter number; and a third inclination larger than the second inclination and in the range of around an intermediate number to the highest number out of the entire range of variation in the control parameter number.

Also, while the length of the fourth period td continues to decrease with the increase in the control parameter number over the entire range, the inclination of that decrease includes a fourth inclination in the range of the lowest number to around an intermediate number out of the entire range of variation in the control parameter number; a fifth inclination smaller than the fourth inclination and in the range of around intermediate numbers out of the entire range of variation in the control parameter number; and a sixth inclination larger than the fifth inclination and in the range of around an intermediate number to the highest number out of the entire range of variation in the control parameter number.

From another point of view, the setting can be said as follows. When the first period tb is extended over the entire range of variation in the length of the first period tb, the amount of variation in the length of the second period tc with respect to the amount of variation in the length of the first period tb on the periphery of the vicinity of the middle of the range of variation in the length of the second period tc is relatively larger than that in the vicinity of the middle of that range. Similarly, the amount of variation in the length of the fourth period td with respect to the amount of variation in the length of the first period tb on the periphery of the vicinity of the middle of the range of variation in the length of the fourth period td is relatively larger than that in the vicinity of the middle of that range.

From still another point of view, the minimum amount of variation in the length of the second period tc with the change in the control parameter number in a region ranging from around the vicinity of the middle of the range of variation in the length of the second period tc to both ends of that region is set to be relatively larger than that in a region in the vicinity of the middle of that range. Also, the minimum amount of variation in the length of the fourth period td with the change in the control parameter number in a region ranging from around the vicinity of the middle of the range of variation in the length of the fourth period td to both ends of that range is set to be relatively larger than that in a region in the vicinity of the middle of that range.

Figure 13:
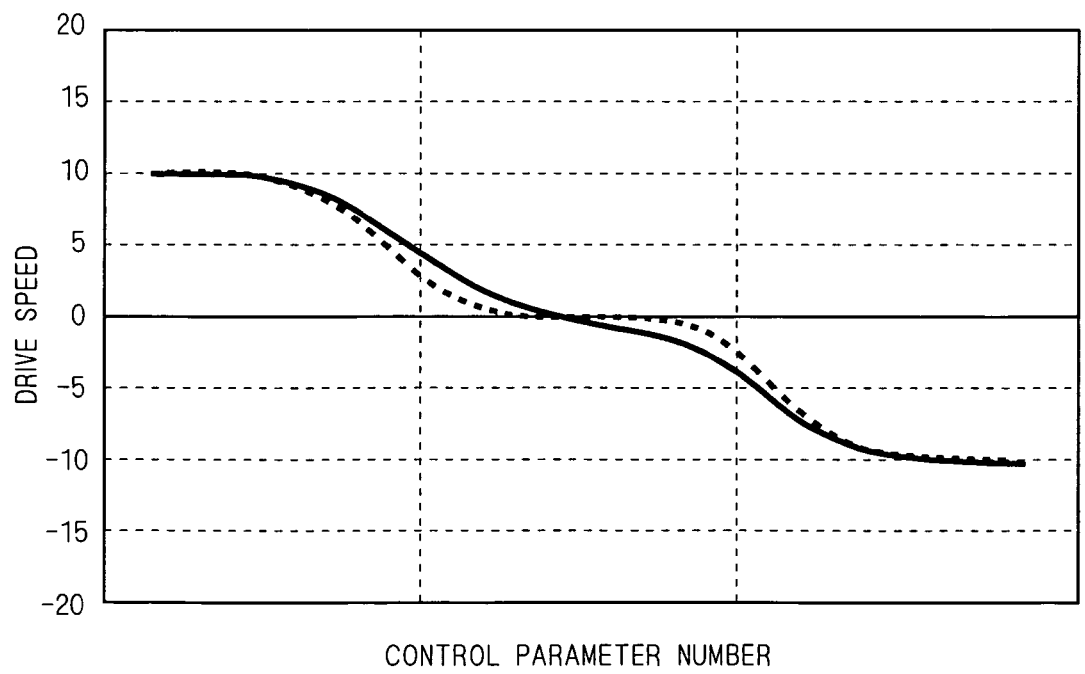
FIG. 13 shows measured values of the drive speed resulting from speed control by time-range control of the drive waveform.

FIG. 13 is a graph showing measured values of the drive speed when the time ranges in the drive waveform are changed using the set of control parameters shown in FIG. 12. In FIG. 13, the solid line shows the measured values of the drive speed of the drive unit 13 obtained by the adoption of the first measure, and the broken line shows the measured values at the time of occurrence of the problem shown in FIG. 10, for comparison.

FIG. 13 shows an improvement in the problem that the drive speed remains unchanged from around 0 in the vicinity of the middle of the entire range of variation in the control parameter number. In the present example, in the vicinity of the middle of the entire range of variation in the control parameter number, the amounts of variation in the lengths of the second period tc and the fourth period td with the change in the control parameter number are made small so that the change in the drive speed of the drive unit 13 with the change in the control parameter number becomes gentle as well. This reduces the occurrence of the problem that the drive speed of the drive unit 13 suddenly approaches 0 and then remains unchanged from around 0 even with the change in the control parameter number.

In other words, a gradual change in the control parameter number in the vicinity of the middle of the entire range of variation in the control parameter number allows a smooth increase and decrease in the drive speed in a low-speed drive range.

In FIG. 12, the range of variation in the control parameter number is roughly divided into three intervals, namely the interval on one end side, the interval in the vicinity of the middle, and the interval on the other end side, and the inclinations of variation in the lengths of the second period tc and the fourth period td with the change in the control parameter number are modified so that the inclination during the interval in the vicinity of the middle becomes smaller than the inclinations during the intervals on the one and the other end sides. However, the invention is not only limited thereto. Alternatively, the interval on the one end side, the interval in the vicinity of the middle, and the interval on the other end side may come in various lengths within the limits that at least either one of the second period tc and the fourth period td is equal to or shorter than the discharge time requirement Pd of the piezoelectric element 11.

As described above, by the adoption of the first measure into the drive device 1, the minimum values of the amounts of variation in the lengths of the second period tc and the fourth period td in the vicinity of the middle of the range of variation in the lengths of the second period tc and the fourth period td are set to be relatively smaller than that on the periphery of the vicinity of the middle of that range. Then, when the second period tc is extended, the third period ta and the fourth period td are shortened and the first period tb is extended; and when the second period tc is shortened, the third period ta and the fourth period td are extended and the first period tb is shortened. Such control allows sufficiently low-speed drive and a smooth change in the drive speed.

While, in the first measure, the inclinations of variation in the lengths of the second period tc and the fourth period td with the change in the control parameter number have inflection points so as to be relatively small in the vicinity of the middle, it is also conceivable to, without changing the inclinations of variation in the lengths of the second period tc and the fourth period td, simply shift the inclinations in a direction to shorten the second period tc and the fourth period td so that at least either one of the second period tc and the fourth period td is always equal to or shorter than the time (discharge time requirement) Pd required for discharge of the piezoelectric element 11. However, in the light of the resonance frequency Te2 of the piezoelectric element 11, such setting is of limited application due to design limitations such as the necessity to keep the sum total of the first to fourth periods tb, tc, ta, and td approximately constant (first limitation) and the necessity not to change the set values of the periods on the ends of the range of variation in the control parameter number in order to ensure a certain level of maximum drive speed (second limitation).

<Second Measure>

As shown in FIG. 10, depending on the setting of the first to fourth periods tb, tc, ta, and td, the undesirable condition can occur in which the drive speed of the drive unit 13 little changes with the change in the control parameter number in the vicinity of both ends of the range of variation in the control parameter number.

A second measure is thus to control the setting of the second period tc and the fourth period td in the vicinity of both ends of the range of variation in the control parameter number, thereby reducing the occurrence of the problem that the drive speed of the drive unit 13 little changes with the change in the control parameter number in the vicinity of both ends of the range of variation in the control parameter number.

FIG. 14 shows the relationship between a set of control parameters and the time ranges of the first to fourth periods tb, tc, ta, and td according to the second measure. In FIG. 14, the first period tb and the third period ta show the same tendencies as those shown in FIG. 11, and the second period tc and the fourth period td show considerably different tendencies from those shown in FIG. 11.

The concrete setting is as follows. The length of the first period tb monotonously increases in proportion to the increase in the control parameter number, and the length of the third period tc monotonously decreases in proportion to the increase in the control parameter number. On the other hand, the length of the second period tc monotonously decreases in proportion to the increase in the control parameter number during an initial interval E2c of increase in the control parameter number, and then monotonously increases in proportional to the increase in the control parameter number during both intermediate and the last intervals C2 and E2d of increase in the control parameter number. The length of the fourth period td monotonously decreases in proportion to the increase in the control parameter number during both initial and intermediate intervals E2c and C2 of increase in the control parameter number, and then monotonously increases in proportion to the increase in the control parameter number during the last interval E2d of increase in the control parameter number.

In other words, the tendency of increase or decrease in the length of each of the second and fourth periods tc and td is reversed in the vicinity of the end of the inclination on the side where the length of that period become the shortest with the change in the control parameter number. That is, a V-shaped variation is exhibited in the lengths of the second and fourth periods tc and td with the change in the control parameter number.

From another point of view, the control parameter number and the first to fourth periods tb, tc, ta, and td are determined as follows. When the length of the first period tb monotonously increases over the entire range of variation in the length of the first period tb, the length of the third period ta monotonously decreases over the entire range of variation in the length of the third period ta. And, when the length of the first period tb monotonously increases in a region (one-end nearby region) in the vicinity of one end of the range of variation in the length of the first period tb on the side where the first period tb becomes the shortest, the lengths of both the second period tc and the fourth period td monotonously decrease. When the length of the first period tb increases in a region (middle nearby region) in the vicinity of the middle of the range of variation in the length of the first period tb, the length of the second period tc monotonously increases and the length of the fourth period td monotonously decreases. When the length of the first period tb monotonously increases in a region (other-end nearby region) in the vicinity of the other end of the range of variation in the length of the first period tb on the side where the first period tb becomes the longest, the lengths of both the second period tc and the fourth period td monotonously increase.

FIG. 15 is a graph showing measured values of the drive speed of the drive unit 13 when the time ranges in the drive waveform are changed using the set of control parameters shown in FIG. 14. In FIG. 15, the solid line shows measured values of the drive speed of the drive unit 13 obtained by the adoption of the second measure, and the broken line shows measured values at the time of occurrence of the problem shown in FIG. 10, for comparison.

FIG. 15 shows an improvement in the problem that the drive speed remains unchanged in the vicinity of both ends of the entire range of variation in the control parameter number. In other words, a gradual change in the control parameter number in the vicinity of both ends of the entire range of variation in the control parameter number allows a smooth increase and decrease in the drive speed of the drive unit 13 in a relatively wide range.

In FIG. 14, the range of variation in the control parameter number is roughly divided into three intervals, namely the interval E2c on one end side, the interval C2 in the vicinity of the middle, and the interval E2d on the other end side. The length of the second period tc is set to, with the monotonous increase in the control parameter number, monotonously decrease during the interval E2c and monotonously increase during the intervals C2 and E2d. The length of the fourth period td is set to, with the monotonous increase in the control parameter number, monotonously decrease during the intervals E2c and C2 and monotonously increase during the interval E2d. However, the setting is not limited thereto, and the proportions of the interval E2c on one end side and the interval E2d on the other end side in the entire range of variation in the control parameter number may be changed as appropriate.

As described above, by the adoption of the second measure into the drive device 1, when the first period tb is extended over the entire range of variation in the length of the first period tb, the third period ta is shortened over the entire range of variation in the length of the third period ta. At this time, when the first period tb is extended in the vicinity of one end of the range of variation in the length of the first period tb on the side where the first period tb becomes the shortest, both the second period tc and the fourth period td are shortened. When the first period tb is extended in the vicinity of the middle of the range of variation in the length of the first period tb, the second period tc is extended and the fourth period td is shortened. When the first period tb is extended in the vicinity of the other end of the range of variation in the length of the first period tb on the side where the first period tb becomes the longest, both the second period tc and the fourth period td are extended. This results in a smooth change in the drive speed.

<Third Measure>

The first measure described above has solved the problem that can occur in the vicinity of the middle of the range of variation in the control parameter number, and the second measure described above has solved the problem that can occur in the vicinity of both ends of the range of variation in the control parameter number. A third measure makes use of the features of both the first and second measures in order to solve both the problems that can occur in the vicinity of the middle and both ends of the range of variation in the control parameter number.

Figure 16:
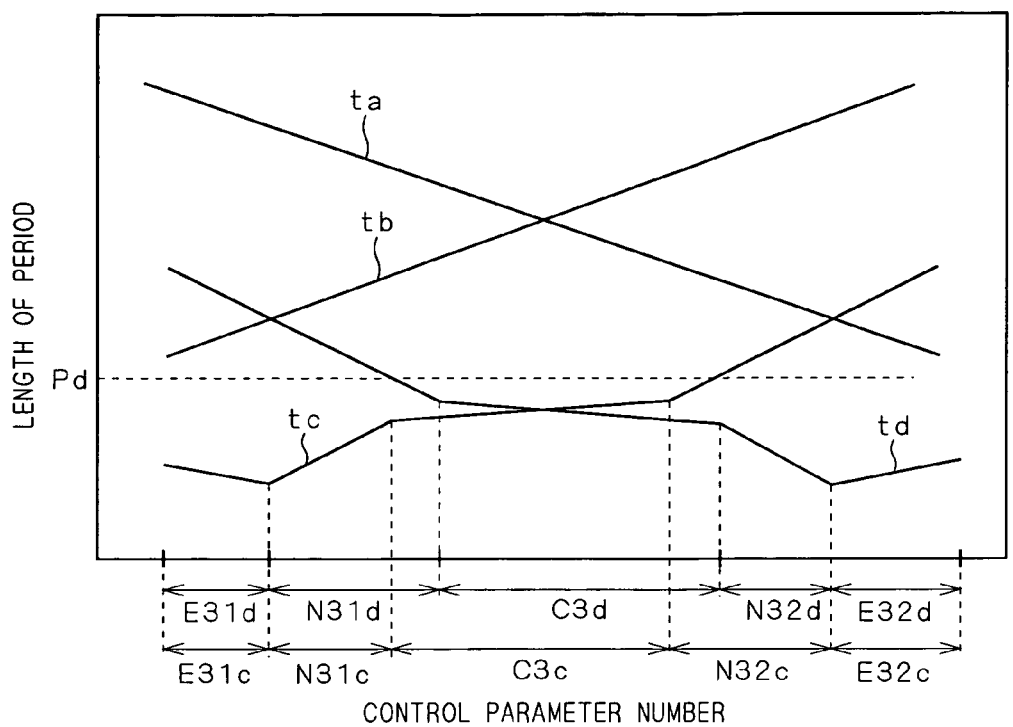
FIG. 16 shows the relationship between the time ranges in the drive waveform and the control parameter number.

FIG. 16 shows the relationship between a set of control parameters and the time ranges of the first to fourth periods tb, tc, ta, and td according to the third measure. In FIG. 16, the first period tb and the third period ta show the same tendencies as those shown in FIG. 11, and the second period tc and the fourth period td show considerably different tendencies from those shown in FIG. 11.

The concrete setting is as follows. The length of the first period tb monotonously increases in proportion to the increase in the control parameter number, and the length of the third period ta monotonously decreases in proportional to the increase in the control parameter number. On the other hand, as to the second period tc, the range of variation in the control parameter number is divided in the order of increase into four intervals: (c1) an initial interval E31c; (c2) an interval N31c between the initial and middle intervals; (c3) a middle interval C3c; and (c4) the sum of an interval N32c between the middle and the last intervals and the last interval E32c, and the second period tc have different inclinations of increase and decrease in length during those four intervals. As to the fourth period td, the range of variation in the control parameter number is divided in the order of increase into four intervals: (d1) the sum of an initial interval E31d and an interval N31d between the initial and middle intervals; (d2) a middle interval C3d; (d3) an interval N32d between the middle and last intervals; and (d4) the last interval E32d, and the fourth period td have different inclinations of increase and decrease in length during those four intervals.

More specifically, the length of the second period tc, with the increase in the control parameter number, monotonously decreases during the initial interval E31c; then monotonously increases at a given inclination during the interval N31c between the initial and middle intervals; then during the middle interval C3c, increases at a relatively smaller inclination than that during the interval N31c; and then during the interval N32c between the middle and the last intervals and during the last interval E32c, increases at a relatively larger inclination than that during the middle interval C3c. Also, the length of the fourth period td, with the increase in the control parameter number, monotonously decreases at a given inclination during the initial interval E31d and during the interval N31d between the initial and middle intervals; then during the middle interval C3d, decreases at a relatively smaller inclination than that during the intervals E31d and N31d; then during the interval N32d between the middle and the last intervals, decreases at a relatively larger inclination than that during the interval C3d; and then monotonously increases during the last interval E32d.

That is, a V-shaped variation is exhibited in the lengths of the second period tc and the fourth period td with the increase in the control parameter number. And, in order that either one of the second and fourth periods tc and td can be always shorter than the discharge time requirement Pd of the piezo-electric element 11, the inclinations of increase and decrease in the lengths of the second and fourth periods tc and td with the change in the control parameter number in the vicinity of the middle of the entire range of variation in the control parameter number are set to be relatively smaller than those inclinations in the periphery of the vicinity of the middle of that range.

Figure 17:
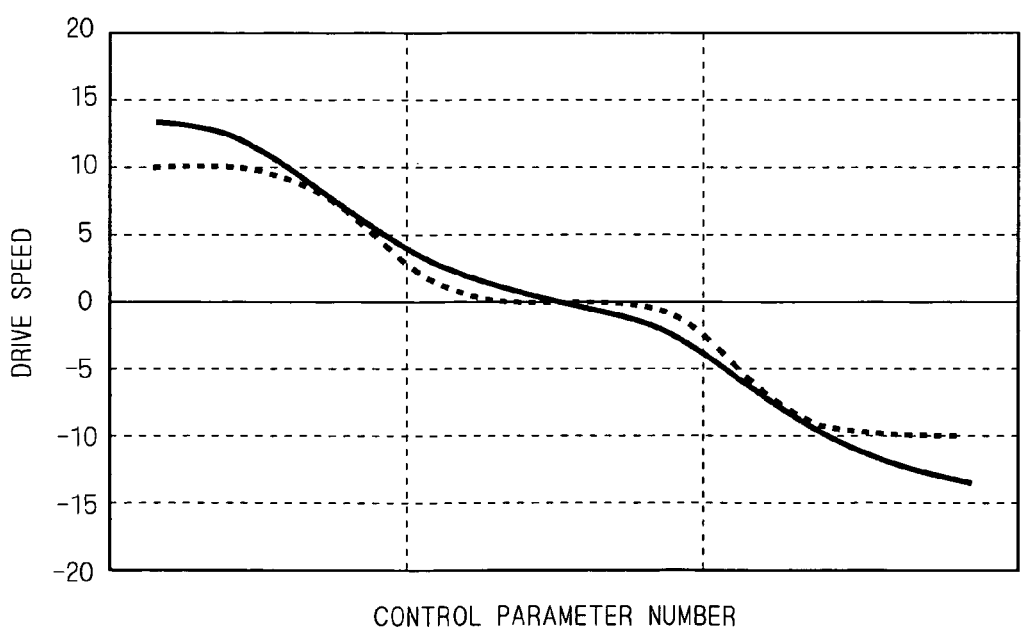
FIG. 17 shows measured values of the drive speed resulting from speed control by time-range control of the drive waveform.

FIG. 17 is a graph showing measured values of the drive speed of the drive unit 13 when the time ranges in the drive waveform are changed using the set of control parameters shown in FIG. 16. In FIG. 17, the solid line shows measured values of the drive speed of the drive unit 13 obtained by the adoption of the third measure, and the broken line shows measured values at the time of occurrence of the problem shown in FIG. 10, for comparison.

FIG. 17 shows an improvement in the problem that the drive speed of the drive unit 13 remains unchanged in the vicinity of the middle and both ends of the entire range of variation in the control parameter number. In other words, a gradual change in the control parameter number in the vicinity of both the middle and both ends of the entire range of variation in the control parameter number allows a smooth increase and decrease in the drive speed of the drive unit 13 in a relatively wide range.

While, as above described, both the second and fourth periods tc and td have different inclinations of increase and decrease in length during the corresponding four intervals of the range of variation in the control parameter number, the way of division into the four intervals is not limited to those shown in FIG. 16, and the length of each interval can be changed as appropriate.

As described above, the adoption of the third measure into the drive device 1 brings about operational advantages including both operational advantages obtained by the adoption of the first and second measures into the drive device 1. Consequently, sufficiently low-speed drive and a smooth change in the drive speed are possible.

<Example Application of Drive Device to Imaging Device>

The drive device 1 described above can be used in a camera-shake correction mechanism of a camera (imaging device). The mechanism of such a camera is now described in detail.

Figure 18:
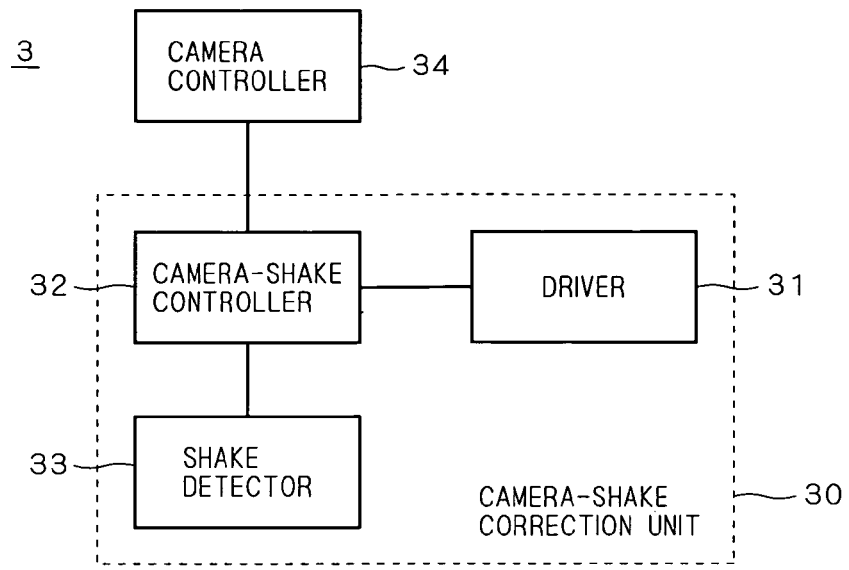
FIG. 18 is a block diagram showing the essential part of the configuration of a camera with the capability of correcting camera shake.

FIG. 18 is a block diagram showing the essential part of the structure of a camera 3 with the capability of correcting camera shake.

The camera 3 is, for example, a digital camera, and it includes a camera-shake correction unit 30 serving as a camera-shake correction mechanism and a camera controller 34 connected to the camera-shake correction unit 30 to allow transmission. This camera controller 34 controls the entire operation of the camera 3 except camera-shake correction, and, as the need of camera-shake correction arises, transmits a signal to the camera-shake correction unit 30 to specify the start or end of camera-shake correction.

The camera-shake correction unit 30 includes a driver 31 corresponding to the drive device 1, a camera-shake correction controller 32, and a shake detector 33.

The shake detector 33 includes, for example, an angular velocity sensor, and detects the shake of the camera 3 and outputs a signal responsive to a change in the direction of image capturing.

The camera-shake correction controller 32 determines the amount of camera-shake correction based on the signal output from the shake detector 33, and outputs a drive signal responsive to this amount of camera-shake correction to the driver 31. Then, the driver 31 exercises drive control (velocity control) of the drive unit 13 based on this drive signal, which results in the execution of proper camera-shake correction. That is, the function (also referred to as the "image-movement correction function" or the "image-movement control function") of controlling image movement in a captured image due to the shake of the camera 3 caused by hand movements.

As described above, the application of the drive device 1 with the piezoelectric element 11 in the camera-shake correction mechanism of the camera 3 achieves downsizing of the camera. Not only the camera-shake correction mechanism but also other mechanisms such as a lens drive mechanism of the camera can use the drive device 1 to achieve downsizing of the camera.

<Modifications>

While the preferred embodiments of the invention have been described so far, the invention is not limited to those described above.

For example, for high-speed drive using the resonance frequency of the piezoelectric element 11, it is preferable, in the drive device 1 adopting any one of the aforementioned first to third measures according to the preferred embodiments described above, that the sum total of the first to fourth periods tb, tc, ta, and td should be kept approximately constant to be equivalent to the cycle of the resonance frequency of the piezoelectric element 11.

The aforementioned preferred embodiments have described the first to third measures to solve the problem that the drive speed little changes with the change in the control parameter number during a specific interval of the range of variation in a set of control parameters, and show the relationship between the set of control parameters and the time ranges of the first to fourth periods tb, tc, ta, and td in FIGS. 12, 14, and 16. However, the relationship between the set of control parameters and the time ranges of the first to fourth periods tb, tc, ta, and td that can solve the problem that the drive speed little changes with the change in the control parameter number is not only limited thereto, and there are various modifications. Now, such modifications are described by giving two operative examples.

First Operative Example

Figure 19:
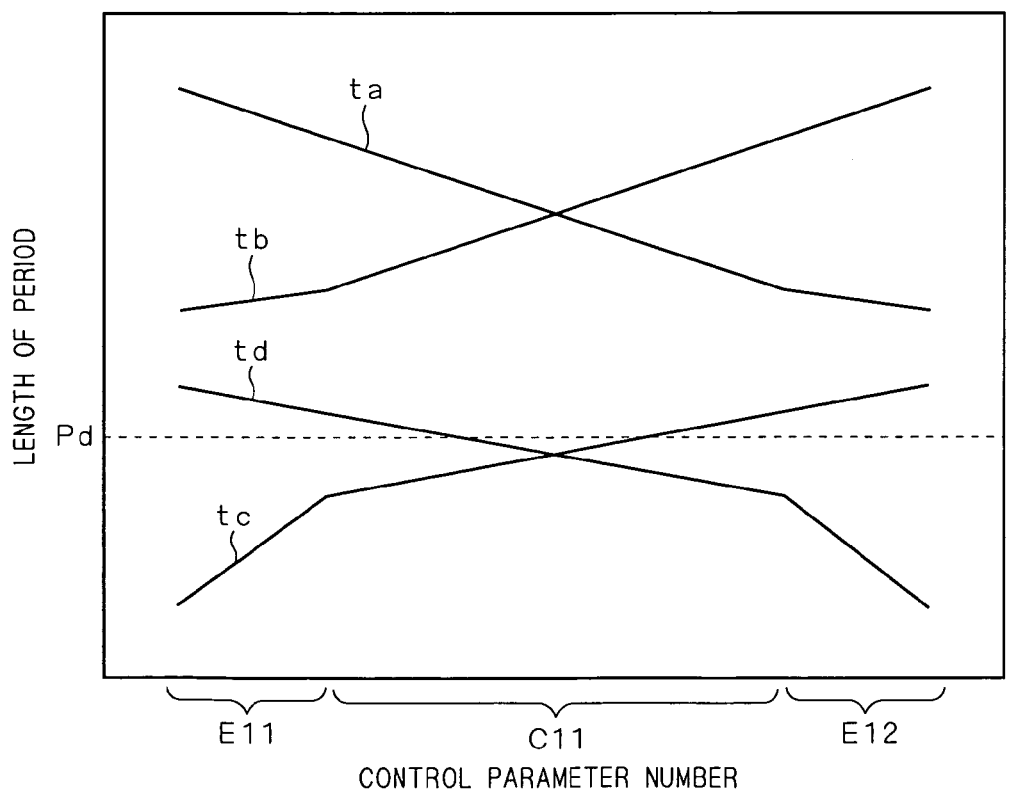
FIG. 19 shows the relationship between the time ranges in the drive waveform and the control parameter number according to a modification.

FIG. 19 shows the relationship between a set of control parameters and the time ranges of the first to fourth periods tb, tc, ta, and td according to this modification.

FIG. 19, like FIG. 12, shows the tendency that the first period tb and the third period ta are complementarily extended and shortened; the second period tc and the fourth period td are complementarily extended and shortened; and with the increase in the control parameter number, the first period tb and the second period tc are extended and the third period ta and the fourth period td are shortened.

More specifically, when the range of variation in the control parameter number is divided into three intervals: an interval (low-number interval) E11 of relatively low numbers; an interval (medium-number interval) C11 of medium numbers; and an interval (high-number interval) E12 of relatively high numbers, the following tendencies are shown.

The length of the first period tb, with the increase in the control parameter number, increases at a relatively small inclination (seventh inclination) during the low-number interval E11 and then increases at an inclination (eighth inclination) larger than the seventh inclination during the medium-number interval C11 and the high-number interval E12. On the other hand, the length of the third period ta, with the increase in the control parameter number, decreases at a relatively large inclination (ninth inclination) during the low-number interval E11 and the medium-number interval C11 and then decreases at an inclination (tenth inclination) smaller than the ninth inclination during the high-number interval E12.

The length of the second period tc, with the increase in the control parameter number, increases at a relatively large inclination (eleventh inclination) during the low-number interval E11 and then increase at an inclination (twelfth inclination) smaller than the eleventh inclination during the medium-number interval C11 and the high-number interval E12. On the other hand, the length of the fourth period td, with the increase in the control parameter number, decreases at a relatively small inclination (thirteenth inclination) during the low-number interval E11 and the medium-number interval C11 and then decreases at an inclination (fourteenth inclination) larger than the thirteenth inclination during the high-number interval E12.

The second period tc and the fourth period td showing the tendencies of increase and decrease described above are so set that at least either one of the second period tc and the fourth period td is always equal to or shorter than the discharge time requirement Pd of the piezoelectric element 11. In other words, by appropriately changing the inclinations of increase and decrease and the minimum amounts of variation in the lengths of the second period tc and the fourth period td with the increase in the control parameter number, at least either one of the second period tc and the fourth period td can be set always equal to or shorter than the discharge time requirement Pd of the piezoelectric element 11.

From this, the drive voltage Vload doesn't remain 0 V even after completion of the discharge of the piezoelectric element 11, which as a result can solve the problem that the discharge of the piezoelectric element 11 shows a constant inclination. This, as shown in FIG. 13, accordingly solves the problem that the drive speed remains unchanged from around 0 in the vicinity of the middle of the entire range of variation in the control parameter number, thereby achieving the effect of a smooth increase and decrease in the drive speed in a low-speed drive range.

Further, the inclination of increase in the length of the second period tc with the increase in the control parameter number during the low-number interval E11 is set to be relatively larger than that during the medium-number interval C11 and the high-number interval E12. On the other hand, the inclination of decrease in the length of the fourth period td with the increase in the control parameter number during the high-number interval E12 is set to be relatively larger than that during the low-number interval E11 and the medium-number interval C11.

In other words, the minimum amount of variation in the length of the second period tc on the periphery of the vicinity of the middle of the range of variation in the length of the second period tc is set to be relatively larger than that in the vicinity of the middle of that range. Also, the minimum amount of variation in the length of the fourth period td on the periphery of the vicinity of the middle of the range of variation in the length of the fourth period td is set to be relatively larger than that in the vicinity of the middle of that range.

This setting, as shown in FIG. 15, avoids the problem that the drive speed remains unchanged in the vicinity of both ends of the entire range of variation in the control parameter number, thereby achieving the effect of a smooth increase and decrease in the drive speed of the drive unit 13 in a relatively wide range.

In order to avoid the problem that the drive speed remains unchanged in the vicinity of at least one end of the entire range of variation in the control parameter number, the inclination of increase or decrease and the minimum amount of variation in the length of at least either one of the second period tc and the fourth period td with the change in the control parameter number should have inflection points for proper control of the inclination during the low-number interval E11 and the high-number interval E12. In other words, the rate of change in the length of at least either one of the second period tc and the fourth period td with respect to the change in the length of the first period tb should be changed during the increase in the length of the first period tb.

From another point of view, if at least either one of the second period tc and the fourth period td is set to be, preferably always, equal to or shorter than the discharge time requirement Pd of the piezoelectric element 11 by appropriately changing the inclination of change in the length of at least either one of the second period tc and the fourth period td with respect to the change in the length of the first period tb during the increase in the length of the first period, the problem that the drive speed remains unchanged from around 0 can be avoided not only in the vicinity of the ends of the entire range of variation in the control parameter number but also in the vicinity of the middle of that range. Accordingly, there is also the effect of a smooth increase and decrease in the drive speed in a low-speed drive range.

Further, for example, at least either by setting the minimum amount of variation in the length of the second period tc on the periphery of the vicinity of the middle of the range of variation in the length of the second period tc to be relatively larger than that in the vicinity of the middle of that range, or by setting the minimum amount of variation in the length of the fourth period td on the periphery of the vicinity of the middle of the range of variation in the length of the fourth period td to be relatively larger than that in the vicinity of the middle of that range, it becomes possible to control, as appropriate, the inclination of increase or decrease in the length of at least either one of the second period tc and the fourth period td during the low-number interval E11 or the high-number interval E12, and also to set at least either one of the second period tc and the fourth period td to be always equal to or shorter than the discharge time requirement Pd of the piezoelectric element 11. This consequently achieves the effect of a smooth increase and decrease in the drive speed in a low-speed drive range.

From still another point of view, as shown in FIG. 19, when the first period tb is extended, the amount of variation in the length of the second period tc with respect to the amount of variation in the length of the first period tb on the periphery of the vicinity of the middle of the range of variation in the length of the second period tc is set to be relatively larger than that in the vicinity of the middle of that range, and the amount of variation in the length of the fourth period td with respect to the amount of variation in the length of the first period tb on the periphery of the vicinity of the middle of the range of variation in the length of the fourth period td is set to be relatively larger than that in the vicinity of the middle of that range. With such a configuration, as in the first measure described above, at least either one of the second period tc and the fourth period td can be set to be, preferably always, equal to or shorter than the discharge time requirement Pd of the piezoelectric element 11.

In order to avoid the problem that the drive speed remains unchanged from around 0 in the vicinity of the middle and to achieve the effect of a smooth increase and decrease in the drive speed in a low-speed drive range, for example when the first period tb is extended, at least either of the following conditions should be satisfied: the amount of variation in the length of the second period tc with respect to the amount of variation in the length of the first period tb on the periphery of the vicinity of the middle of the range of variation in the length of the second period tc is set to be relatively larger than that in the vicinity of the middle of that range; and/or the amount of variation in the length of the fourth period td with respect to the amount of variation in the length of the first period tb on the periphery of the vicinity of the middle of the range of variation in the length of the fourth period td is set to be relatively larger than that in the vicinity of the middle of that range.

Further, as shown in FIG. 19, in response to an appropriate change in the inclination of increase and decrease in the lengths of the second period tc and the fourth period td with the change in the control parameter number, the inclinations of increase and decrease in the lengths of the first period tb and the third period ta with the change in the control parameter number are changed as appropriate so that the sum total of the first to fourth periods tb, tc, ta, and td is kept approximately constant. This allows high-speed drive using the resonance frequency of the piezoelectric element 11.

From the above description, the first operative example of the modification, as shown in FIG. 17, can achieve the same operational advantages as those obtained by the adoption of the third measure into the drive device 1. That is, sufficiently low-speed drive and a smooth change in the drive speed are possible.

Second Operative Example

Figure 20:
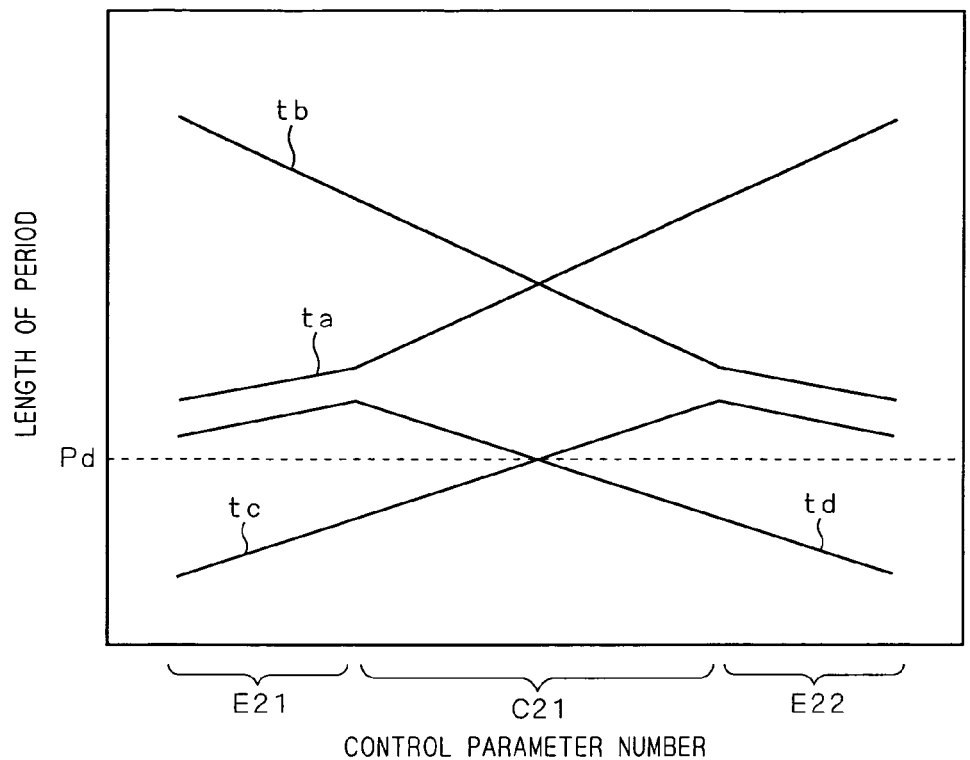
FIG. 20 shows the relationship between the time ranges in the drive waveform and the control parameter number according to another modification.
Figure 21A:
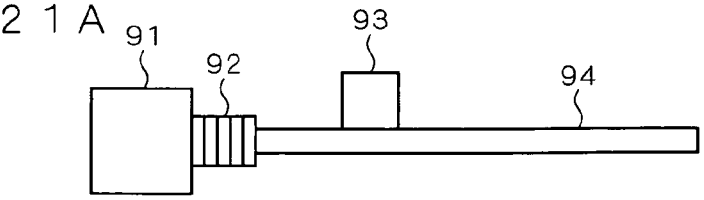
FIGS. 21A to 21C, FIG. 22, FIGS. 23A to 23C, FIG. 24, and FIGS. 25A and 25B are explanatory diagrams for explanation of drive devices according to conventional techniques of the invention.
Figure 21B:
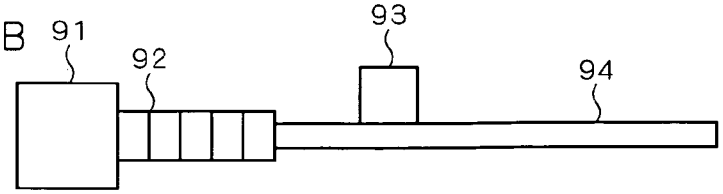
Figure 21C:
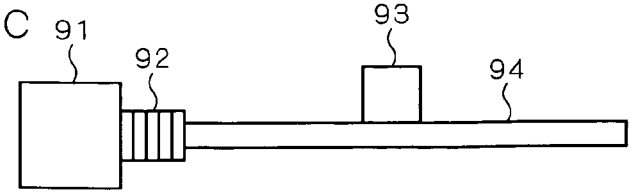
Figure 22:
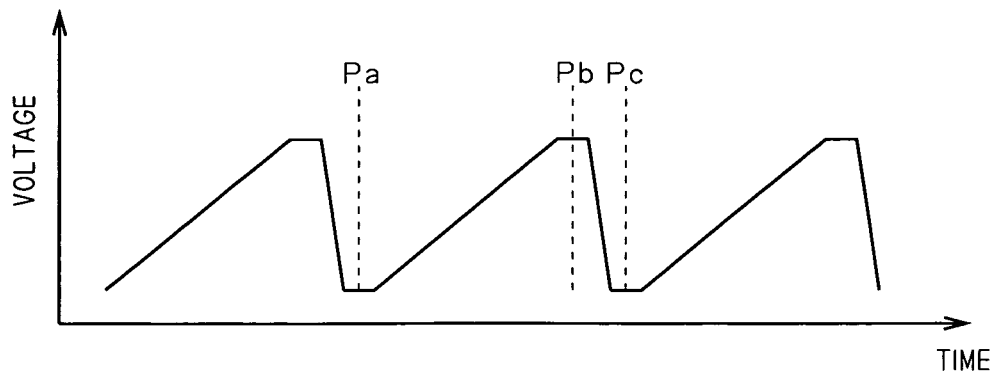
Figure 23A:
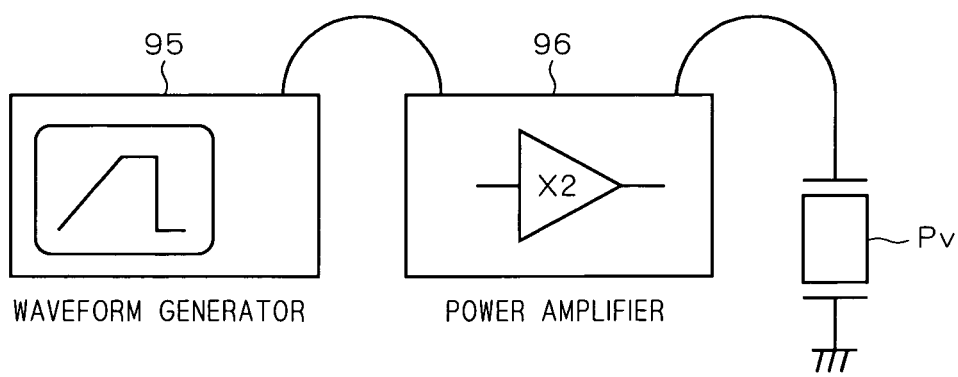
Figure 23B:
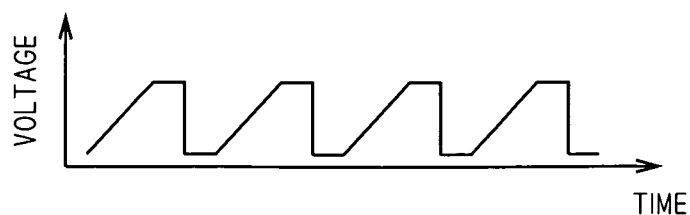
Figure 23C:
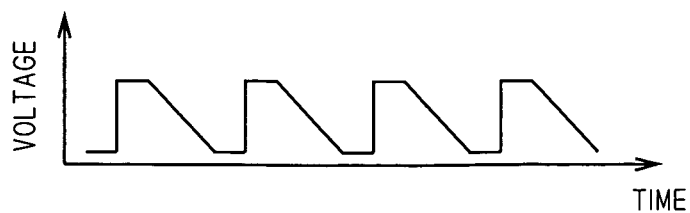
Figure 24:
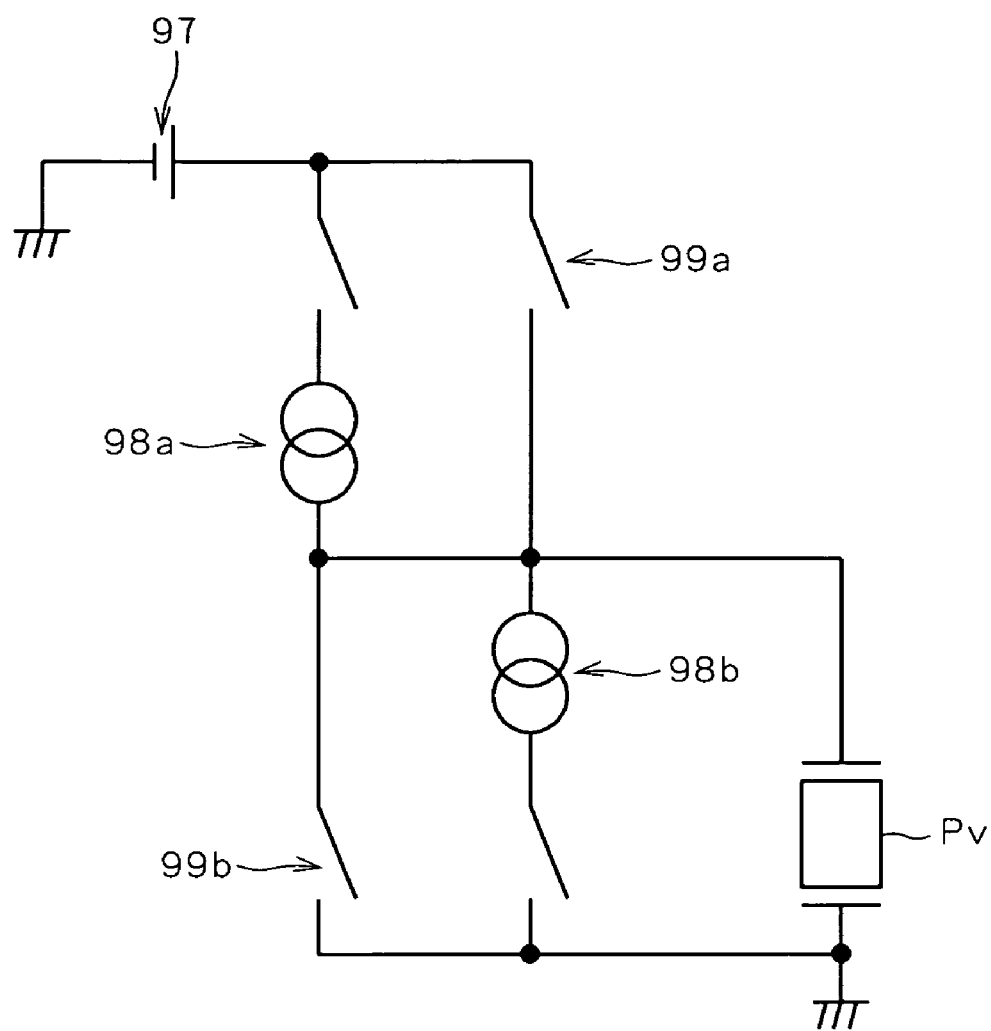
Figure 25A:
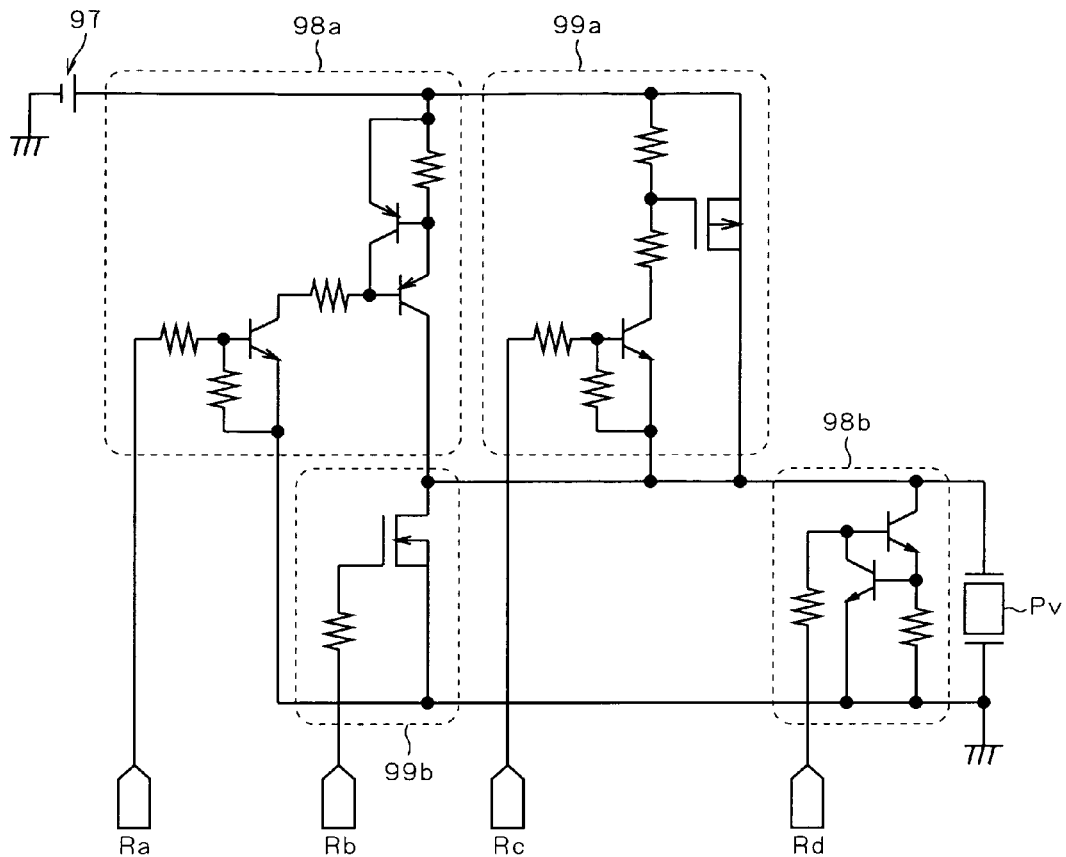
Figure 25B:
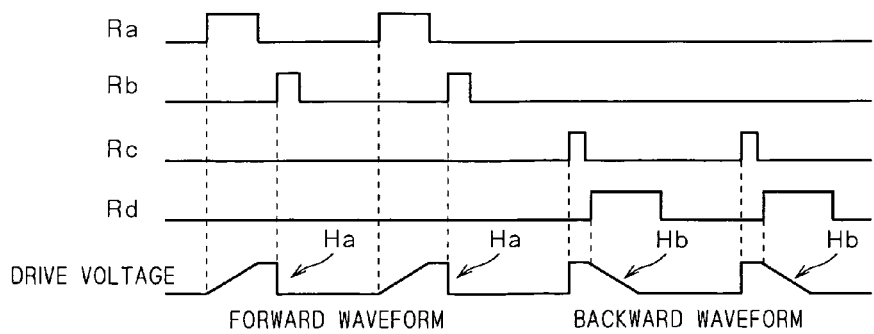

FIG. 20 shows the relationship between a set of control parameters and the time ranges of the first to fourth periods tb, tc, ta, and td according to another modification.

Referring to FIG. 20, as shown in FIG. 12, the first period tb and the third period ta are complementarily extended and shortened, and the second period tc and the fourth period td are complementarily extended and shortened. Further, like in FIG. 12, there is a tendency to mostly extend the second period tc and mostly shorten the fourth period td with the increase in the control parameter number. On the other hand, unlike in FIG. 12, there is a tendency to extend the third period ta and shorten the first period tb with the increase in the control parameter number.

More specifically, the range of variation in the control parameter number is divided into three intervals: an interval of relatively low numbers (low-number interval) E21; an interval of medium numbers (medium-number interval) C21; and an interval of relatively high numbers (high-number interval) E22. Then, the following tendency is shown.

The length of the third period ta, with the increase in the control parameter number, increases at a relatively small inclination (fifteenth inclination) during the low-number interval E21 and then increases at an inclination (sixteenth inclination) larger than the fifteenth inclination during the medium-number interval C21 and the high-number interval E22. On the other hand, the length of the first period tb, with the increase in the control parameter number, decreases at a relatively large inclination (seventeenth inclination) during the low-number interval E21 and the medium-number interval C21 and then decreases at an inclination (eighteenth inclination) smaller than the seventeenth inclination during the high-number interval E22.

The length of the second period tc, with the increase in the control parameter number, increases at a relatively small inclination (nineteenth inclination) during the low-number interval E21 and the medium-number interval C21 and then decreases at a relatively small inclination (twelfth inclination) during the high-number interval E22. On the other hand, the length of the fourth period td, with the increase in the control parameter number, increases at a relatively small inclination (twenty-first inclination) during the low-number interval E21 and then decreases at a relatively small inclination (twenty-second inclination) during the medium-number interval C21 and the high-number interval E22.

The second period tc and the fourth period td showing the tendencies of increase and decrease described above are so set that the length of at least either one of the second period tc and the fourth period td should be, preferably always, equal to or shorter than the discharge time requirement Pd of the piezoelectric element 11. In other words, an appropriate change in the inclinations of increase and decrease and the minimum amounts of variation in the lengths of the second period tc and the fourth period td with the increase in the control parameter number allows at least either one of the second period tc and the fourth period td to be set always equal to or shorter than the discharge time requirement Pd of the piezoelectric element 11.

From this, the drive voltage Vload doesn't remain 0 V even after completion of the discharge of the piezoelectric element 11, which as a result avoids the problem that the discharge of the piezoelectric element 11 shows a constant inclination. This, as shown in FIG. 13, accordingly avoids the problem that the drive speed remains unchanged from around 0 in the vicinity of the middle of the entire range of variation in the control parameter number, thereby achieving the effect of a smooth increase and decrease in the drive speed in a low-speed drive range.

Further, the tendency of increase or decrease in the length of each of the second and fourth periods tc and td is reversed in the vicinity of the end of the inclination on the side where the length of that period becomes the longest with the change in the control parameter number. In other words, switching between increase and decrease in the lengths of the second and fourth periods tc and td takes place at a time between when the first period tb is extended in a region in the vicinity of one or the other end of the range of variation in the length of the first period tb and when the first period tb is extended in a region in the vicinity of the middle of the range of variation in the length of the first period tb. That is, a V-shaped variation is exhibited in the lengths of the second and fourth periods tc and td with the change in the control parameter number.

This setting, as shown in FIG. 15, avoids the problem that the drive speed remains unchanged in the vicinity of both ends of the entire range of variation in the control parameter number, thereby achieving the effect of a smooth increase and decrease in the drive speed of the drive unit 13 in a relatively wide range.

In order to avoid the problem that the drive speed remains unchanged in the vicinity of at least one end of the entire range of variation in the control parameter number, switching between increase and decrease in the length of at least either one of the second and fourth periods tc and td should take place at a time between when the first period tb is extended in a region the vicinity of one or the other end of the range of variation in the length of the first period tb and when the first period tb is extended in a region in the vicinity of the middle of the range of variation in the length of the first period tb.

Accordingly, the inclinations of increase and decrease and the minimum amount of variation in the length of at least either one of the second and fourth periods tc and td with the change in the control parameter number should have inflection points so as to be properly changed during the low-number interval E21 and the high-number interval E22. In other words, the inclination of change in the length of at least either one of the second period tc and the fourth period td with respect to the change in the length of the first period tb should be changed as appropriate during the increase in the length of the first period tb.

Further, as shown in FIG. 20, in response to an appropriate change in the inclination of increase and decrease in the lengths of the second and fourth periods tc and td with the change in the control parameter number, the inclinations of increase and decrease in the lengths of the first and third period tb and ta with the change in the control parameter number are changed as appropriate so that the sum total of the first to fourth periods tb, tc, ta, and td is kept approximately constant. This allows high-speed drive using the resonance frequency of the piezoelectric element 11.

From the above description, the second operative example of the modifications, like the first operative example of the modifications, can achieve the same operational advantages as those obtained by the adoption of the third measure in the drive device 1. That is, sufficiently low-speed drive and a smooth change in the drive speed are possible.

While the preferred embodiments described above achieve accurate and smooth drive-speed control by using and, whenever necessary, switching control parameters of all control parameter numbers, the invention is not limited thereto. As an alternative, the following two mode may be switched as appropriate: a first mode in which high-precision drive-speed control is performed using control parameters of all control parameter numbers; and a second mode in which low-precision drive-speed control is performed using control parameters of only part of all control parameter numbers. These first and second modes can be used properly depending on applications and situations. This mode switching is, for example, implementable by the user operating a given control unit.

While, in the preferred embodiments described above, the drive device 1 uses a piezoelectric element, the invention is not limited thereto, and other electromechanical transducers such as an electrostriction element, a magnetostrictor, and an electrostatic actuator may be used, in which electrical energy including voltage, current, electric field, magnetic field, static electricity, and the like is converted into mechanical energy including expansion and contraction, bending, torsion, distortion, and the like.

It goes without saying that the configurations described in the above preferred embodiments and the various configurations of the modifications can be combined as appropriate without causing any contradiction so as to combine the operational advantages of those configurations.

While the invention has been shown and described in detail, the foregoing description is in all aspects illustrative and not restrictive. It is therefore understood that numerous modifications and variations can be devised without departing from the scope of the invention.

What is claimed is:

1. A drive device comprising:
an electromechanical transducer expanding and contracting in response to application of voltage;
a given member moving back and forth with expansion and contraction of said electromechanical transducer;
a moving part being engaged with said given member by a frictional force and capable of moving relative to said given member with expansion and contraction of said electromechanical transducer; and
a voltage applying part applying voltage to said electromechanical transducer by repetition of an output cycle in which a selected one of a first voltage value, a second voltage value lower than said first voltage value, and a third voltage value lower than said second voltage value is output,
said output cycle being a cycle of firstly outputting said first voltage value during a first period, secondly outputting said second voltage value during a second period, thirdly outputting said third voltage value during a third period, and finally outputting said second voltage value during a fourth period,
wherein said voltage applying part is configured to change a moving speed of said moving part relative to said given member by varying the lengths of said first to fourth periods,
said voltage applying part being further configured such that as the length of said first period is changed across a range from a minimum to maximum value thereof, at least one of the rates of change in the lengths of said second and fourth periods is changed at least once.

2. The drive device according to claim 1, wherein
said voltage applying part is configured to vary the lengths of said first to fourth periods so that at least either one of said second and fourth periods is equal to or shorter than a time required for discharge of said electromechanical transducer.

3. The drive device according to claim 1, wherein
as said voltage applying part changes the length of said first period across a range from a minimum to maximum value, the minimum rate of change of said second period differs between in the middle portion of the range and in the end portions of the range.

4. The drive device according to claim 1, wherein
as said voltage applying part changes the length of said first period across a range from a minimum to maximum value, the minimum rate of change of said fourth period differs between in the middle portion of the range and in the end portions of the range.

5. The drive device according to claim 1, wherein
as said voltage applying part changes the length of said first period across a range from a minimum to maximum value, the magnitude of the rate of change of second period in a region on the end portions of the range is set to be relatively larger than that in a region in the middle portion of that range.

6. The drive device according to claim 1, wherein
as said voltage applying part changes the length of said first period across a range from a minimum to maximum value, the magnitude of the rate of change of fourth period in a region on the end portions of the range is set to be relatively larger than that in a region in the middle portion of that range.

7. The drive device according to claim 1, wherein
when said voltage applying part changes the length of said first period across a range from a minimum to maximum value, the ratio of the magnitude of the rate of change in the length of said second period versus the magnitude of the rate of change in the length of said first period in a region on the end portion of the range is set to be relatively larger than that in a region in the middle portion of that range.

8. The drive device according to claim 1, wherein
when said voltage applying part changes the length of said first period across a range from a minimum to maximum value, the ratio of the magnitude of the rate of change in the length of said fourth period versus the magnitude of the rate of change in the length of said first period in a region on the end portion of the range is set to be relatively larger than that in a region in the middle portion of that range.

9. The drive device according to claim 1, wherein
as said voltage applying part changes the length of said first period across a range from a minimum to maximum value, said voltage applying part is configured to switch between a positive and negative rate of change in the length of at least either one of said second and fourth periods.

10. A drive device comprising:
an electromechanical transducer expanding and contracting in response to application of voltage;
a given member moving back and forth with expansion and contraction of said electromechanical transducer;
a moving part being engaged with said given member by a frictional force and capable of moving relative to said given member with expansion and contraction of said electromechanical transducer; and
a voltage applying part applying voltage to said electromechanical transducer by repetition of an output cycle in which a selected one of a first voltage value, a second voltage value lower than said first voltage value, and a third voltage value lower than said second voltage value is output,
said output cycle being a cycle of firstly outputting said first voltage value during a first period, secondly outputting said second voltage value during a second period, thirdly outputting said third voltage value during a third period, and finally outputting said second voltage value during a fourth period,
wherein said voltage applying part is configured to change a moving speed of said moving part relative to said given member by varying the lengths of said first to fourth periods,
said voltage applying part being further configured such that as the length of said first period is changed across a range from a minimum to maximum value thereof, the rate of change of at least one of said second and fourth periods is reduced at least once in order to keep at least one of said second and fourth periods equal to or shorter than a time required for discharge of said electromechanical transducer in the middle of the range.

11. The drive device according to claim 1, wherein
said electromechanical transducer includes a piezoelectric element.

12. The drive device according to claim 11, wherein
a sum total of said first to fourth periods is substantially kept constant.

13. The drive device according to claim 1, wherein
said first voltage value is a positive value, said second voltage value is zero, and said third voltage value is a negative value.

14. The drive device according to claim 1, wherein
said voltage applying part, with reference to one end of said electromechanical transducer, applies voltage corresponding to said first to third voltage values between said one end and the other end of said electromechanical transducer, and
said first voltage value is a positive value, said second voltage value is zero, and said third voltage value is a negative value.

15. The drive device according to claim 10, wherein
said electromechanical transducer includes a piezoelectric element.

16. The drive device according to claim 15, wherein
a sum total of said first to fourth periods is substantially kept constant.

17. The drive device according to claim 10, wherein
said first voltage value is a positive value, said second voltage value is zero, and said third voltage value is a negative value.

18. The drive device according to claim 10, wherein
said voltage applying part, with reference to one end of said electromechanical transducer, applies voltage corresponding to said first to third voltage values between said one end and the other end of said electromechanical transducer, and
said first voltage value is a positive value, said second voltage value is zero, and said third voltage value is a negative value.

19. A drive device comprising:
an electromechanical transducer expanding and contracting in response to application of voltage;
a given member moving back and forth with expansion and contraction of said electromechanical transducer;
a moving part being engaged with said given member by a frictional force and capable of moving relative to said given member with expansion and contraction of said electromechanical transducer; and
a voltage applying part applying voltage to said electromechanical transducer by repetition of an output cycle in which a selected one of a first voltage value, a second voltage value lower than said first voltage value, and a third voltage value lower than said second voltage value is output,
said output cycle being a cycle of firstly outputting said first voltage value during a first period, secondly outputting said second voltage value during a second period, thirdly outputting said third voltage value during a third period, and finally outputting said second voltage value during a fourth period,
said voltage applying part, with reference to one end of said electromechanical transducer, applying voltage corresponding to said first to third voltage values between said one end and the other end of said electromechanical transducer,
said first voltage value being a positive value, said second voltage value being zero, and said third voltage value being a negative value which is the same but with an opposite sign as said first voltage value,
wherein said voltage applying part is configured to change a moving speed of said moving part relative to said given member by varying the lengths of said first to fourth periods,
said voltage applying part being further configured such that as the length of said fourth period decreased, the magnitude of the rate of change in the length of said first period is changed to the magnitude of the rate of change of said fourth period, while keeping the sum total of said first to fourth periods at substantially a given period of time, keeping the sum of said first and third period at a first fixed period of time, and keeping a sum of said second and fourth periods at a second fixed period of time.

* * * * *